US011884092B2

(12) United States Patent
Polygerinos et al.

(10) Patent No.: US 11,884,092 B2
(45) Date of Patent: Jan. 30, 2024

(54) WRITING INSTRUMENT COMPRISING A SWITCHABLE FLOW MATERIAL

(71) Applicants: Société BIC, Clichy (FR); BIC Violex S.A., Anoixi (GR)

(72) Inventors: Panagiotis Polygerinos, Clichy (FR); David Michael Duffy, Zürich (CH); Christopher John Wright, London (GB)

(73) Assignees: Société BIC, Clichy (FR); BIC Violex Single Member SA, Anoixi (GR)

( * ) Notice: Subject to any disclaimer, the term of this patent is extended or adjusted under 35 U.S.C. 154(b) by 85 days.

(21) Appl. No.: 17/643,425

(22) Filed: Dec. 9, 2021

(65) Prior Publication Data

US 2022/0184994 A1 Jun. 16, 2022

(30) Foreign Application Priority Data

Dec. 11, 2020 (EP) .................................... 20315490
Sep. 30, 2021 (EP) .................................... 21306354

(51) Int. Cl.
*B43K 1/00* (2006.01)
*B43K 8/22* (2006.01)
*B43K 1/01* (2006.01)

(52) U.S. Cl.
CPC .............. *B43K 1/003* (2013.01); *B43K 1/006* (2013.01); *B43K 1/01* (2013.01); *B43K 8/22* (2013.01)

(58) Field of Classification Search
CPC .......... B43K 1/003; B43K 1/006; B43K 1/12; B43K 8/028; B43K 8/04; B43K 8/22
See application file for complete search history.

(56) References Cited

U.S. PATENT DOCUMENTS 1,109,034 A * 9/1914 Bryan .................... A46B 11/08 401/2
2,272,780 A * 2/1942 Schweyer ............ B43K 5/1845 401/2
3,376,551 A * 4/1968 Armbruster ......... G06F 3/03545 346/146

(Continued)

FOREIGN PATENT DOCUMENTS

EP 2431192 A1 3/2012
EP 3225418 A1 10/2017
WO 2017033555 A1 3/2017

OTHER PUBLICATIONS

European Search Report issued in European Application 21306354.8 dated Mar. 9, 2022 (7 pages).

(Continued)

*Primary Examiner* — David P Angwin
*Assistant Examiner* — Bradley S Oliver
(74) *Attorney, Agent, or Firm* — Bookoff McAndrews, PLLC

(57) ABSTRACT

The present disclosure relates to a writing instrument comprising a tubular body, a reservoir for an ink composition. The writing instrument comprises a nib comprising a switchable flow material, wherein the switchable flow material is configured to switch between a fluid flow preventing condition and a fluid flow enabling condition by a stimulus. The switchable flow material is configured to control flow of the ink composition from the reservoir to or towards a writing surface.

19 Claims, 14 Drawing Sheets

(56) References Cited

U.S. PATENT DOCUMENTS

| | | | | | |
|---|---|---|---|---|---|
| 3,711,211 | A * | 1/1973 | Garrison | B43K 8/22 219/229 |
| 4,211,012 | A * | 7/1980 | Alles | B44B 3/009 346/143 |
| 4,435,099 | A * | 3/1984 | Murahara | B43K 5/18 401/241 |
| 4,634,305 | A * | 1/1987 | Herrnring | B43K 8/22 401/145 |
| 4,746,936 | A * | 5/1988 | Takahashi | B41J 3/28 346/143 |
| 5,676,481 | A * | 10/1997 | Nicoll | B43K 5/1845 401/148 |
| 5,911,533 | A * | 6/1999 | Fassler | B43K 8/22 401/44 |
| 6,727,439 | B2 * | 4/2004 | Chao | G06F 3/03545 345/179 |
| 7,048,459 | B2 * | 5/2006 | Bedhome | B43K 5/1836 401/184 |
| 8,172,475 | B2 * | 5/2012 | Rosenzweig | B41J 2/211 347/109 |
| 8,348,538 | B2 * | 1/2013 | Van Loenen | B43K 29/08 347/109 |
| 8,403,577 | B2 * | 3/2013 | Khoshnevis | B43K 8/03 401/35 |
| 9,050,850 | B2 * | 6/2015 | Gillum | B43K 1/086 |
| 10,300,733 | B1 * | 5/2019 | Maresh | B43K 7/10 |
| 10,688,523 | B2 * | 6/2020 | Skinner | B05C 17/00523 |
| 11,299,329 | B2 * | 4/2022 | Sakata | A45D 34/04 |
| 2006/0051148 | A1 * | 3/2006 | Marquis | B43K 29/004 400/18 |
| 2006/0120795 | A1 * | 6/2006 | Martzloff | B43K 1/12 401/235 |
| 2009/0142124 | A1 | 6/2009 | Dylkiewicz et al. | |
| 2021/0387470 | A1 * | 12/2021 | Duffy | B43K 5/025 |

OTHER PUBLICATIONS

Extended European Search Report dated Jun. 15, 2021 in European Patent Application No. 20315490.1 (9 pages).

Xiying Li et al., "Electrocapillary Rise in Nanoporous Media", Procedia IUTAM, vol. 21, 2017, pp. 71-77, https://www.sciencedirect.com/science/article/pii/S2210983817300536.

Yahui Xue et al., "A Switchable and Compressible Carbon Nanotube Sponge Electrocapillary Imbiber", Advanced Materials, vol. 27, Issue 44, Oct. 13, 2015: 7241-7246, https://onlinelibrary.wiley.com/doi/abs/10.1002/adma.201502837.

Guang Zhang et al., "Enhancement of Evaporative Heat Transfer on Carbon Nanotube Sponges by Electric Field Reinforced Wettability", Applied Surface Science, Published Oct. 1, 2018, https://en.x-mol.com/paper/article/675407.

Zuanka Wang et al., "Polarity-Dependent Electrochemically Controlled Transport of Water through Carbon Nanotube Membranes", Nano Letters, 2007, vol. 7, No. 3, pp. 697-702.

"Graphene smart membranes can control water", University of Manchester, Jul. 12, 2018, (4 pages), https://phys.org/news/2018-07-graphene-smart-membranes.html.

* cited by examiner

WRITING INSTRUMENT COMPRISING A SWITCHABLE FLOW MATERIAL

This application claims priority from EP20315490.1, filed on 11 Dec. 2020 and EP21306354.8, filed on 30 Sep. 2021, the entire contents of which are incorporated herein by reference.

TECHNICAL FIELD

The present disclosure relates to writing instruments, and more particularly to writing instruments that dispense volatile inks, such as felt tip markers and the like.

BACKGROUND OF THE DISCLOSURE

The present disclosure relates to writing instruments that dispense volatile inks, such as felt tip markers and the like. The ink in such writing instruments may have a tendency to evaporate from its writing tip. The writing tip is also referred to as a nib. The ink formulations typically comprise dye and solvent in which the dye is dissolved. These ink solvents are typically volatile; being prone to evaporation when exposed to ambient air. If a sufficient amount of the ink solvent evaporates from the nib, the nib dries out, and the performance of the writing instrument substantially degrades.

The problem with ink evaporating from the nib may be solved by placing a cap over the nib when the writing instrument is not in use. However, this solution has the drawback that the cap is often not put back on the nib after use because users sometimes forget to put the cap back on or because the cap is misplaced. Without the cap, the nib may dry out and shorten the life of the writing instrument.

To overcome the problem of having to provide a cap for the writing instrument, the prior art suggests different solutions. For example, some writing instruments are designed with a self-sealing element integrated into the writing instrument's housing. These writing instruments have their own problems in that such designs are complex, and that the device is relatively bulky since the self-seal is a mechanical seal which requires relatively high forces to press the sealing members onto each other in order to achieve a self-sealing effect. Implementing these forces requires bulk in the sealing material and may result in a writing instrument being unwieldly and lacking elegance. Moreover, given the mechanical complexity of such seals, the assembly is also complex so that they may be unsuitable for high volume manufacturing processes.

Examples of such self-sealing writing instruments are disclosed in US 2009/0142124 A1, which describes a capless writing instrument wherein the writing tip is prevented from drying out by sealing it off to the environment with a sealing mechanism positioned at the writing instrument's tip which is activated by retracting the nib.

It is the object of the present disclosure to provide a simple, filigree and/or cost-effective means of sealing a writing instrument against drying out. Another object of the present disclosure is to provide a pen that does not have to be activated by a user before writing.

SUMMARY OF THE DISCLOSURE

In a first aspect, the present disclosure relates to a writing instrument comprising a tubular body, a reservoir for an ink composition and a nib. The nib comprises a switchable flow material. The switchable flow material is configured to switch between a fluid flow preventing condition and a fluid flow enabling condition by a stimulus. The switchable flow material is configured to control flow of the ink composition from the reservoir to or towards a writing surface.

The switchable flow material may be hydrophobic in the fluid flow preventing condition. The switchable flow material may be hydrophilic in the fluid flow enabling condition. The switchable flow material may be arranged in two or more layers, in particular wherein the layers are separated by an electrically insulating layer. The stimulus may comprise electrical energy and/or thermal energy.

The switchable flow material may comprise a porous material, in particular an electrowettable porous material. The porous material may be arranged in the form of a layer or a membrane. The porous material may comprise pores with a controllable pore size. The switchable flow material may comprise carbon nanotubes (CNT), in particular a carbon nanotube porous material or a carbon nanotube membrane. The switchable flow material may comprise graphene, in particular a graphene oxide membrane. The switchable flow material may comprise an auxetic structure. The switchable flow material may comprise a thermoactivated polymer and/or a shape-memory material.

In addition, the nib may comprise a bulk material and the switchable flow material may at least partially cover the bulk material. For example, the switchable flow material may substantially cover all surfaces of the nib, which face towards the exterior. With that evaporation of the ink composition may be completely or at least substantially prevented. The bulk material of the nib may be configured to transfer the ink composition from the reservoir to or towards a writing surface. The bulk material of the nib may comprise fibers, a porous composite, a foam, a polyurethane foam, a cellulose material, a mineral material, a plastic material, an elastomer material, an hyperelastic material, an elastomer bead material, a bead material, a natural material such as a cork or bast. The material of the nib may have a diameter of at least 0.3 mm.

In addition, the writing instrument may comprise a protective material which at least partially covers the switchable flow material. The protective material may be the same material as the material of the nib or a modified form of the material of the nib, in particular, wherein the protective material forms a layer of about 0.3 mm to about 15 mm.

The writing instrument may comprise a power source. The power source may comprise a friction-based generator, in particular a triboelectric nanogenerator (TENG). The friction-based generator may comprise layers of different materials arranged face to face, in particular wherein the layers are slidable relative to one another. The friction-based generator may be arranged in the distal portion of the tubular body and a portion of the nib may be connected or physically attached to at least an inner layer of the friction-based generator. The switchable flow material of the nib may be connected or physically attached to a layer of the friction-based generator. The writing instrument may be configured such that bending forces of the nib and/or movements of the nib e.g., relative to the tubular body are transferred to an inner layer of the friction-based generator, thereby generating electrical energy for switching the switchable flow material. In other words, movement of the nib may cause a movement of a layer of the friction-based generator or TENG module, thereby generating a stimulus for the switchable flow material. The switchable flow material may then switch from a fluid flow preventing condition to a fluid flow enabling condition.

In addition, or alternatively, the power source may comprise a battery. A friction-based generator or TENG module may then not be required and the stimulus for the switchable flow material may derive from the battery. A user may thus simply activate the switchable flow material by e.g., pressing a button.

Activation of the switchable flow material may also be achieved by a sensor, which is configured to detect that a user is about to use the writing instrument or is using the writing instrument. Such a sensor may comprise one or more of a motion sensor, an orientation sensor, a conductive sensor, a temperature sensor, a force sensor, a gravitation sensor, a hygroscopic sensor, a heartbeat sensor, a photosensor or any other sensor, which is suitable to detect that a user is about to or is using the writing instrument. An artificial intelligence (AI) may also be used to predict that a user is about to start using the writing instrument. For example, if a user shows a certain habit such as using the writing instrument regularly at a certain time point, such information may be used to predict a future use of the writing instrument. The AI may thus be used to "prepare" the writing instrument for use and activate the switchable flow material.

The writing instrument may further comprise conductive components to transfer electrical energy from the power source to the switchable flow material. The writing instrument may further comprise capacitive components to process the output from the power source.

The power source may be configured to deliver a low voltage to the switchable flow material, in particular a voltage between −2 V to +2 V, in particular a voltage between −0.52 V to 1 V.

In addition, or alternatively, the writing instrument may comprise a heating element configured to convert electrical energy to thermal energy. Such an element may be beneficial when using an auxetic structure for the switchable flow material.

The writing instrument may further comprise a flow control system. The flow control system may be configured to modify, change, and/or select the stimulus. The flow control system may be configured to control a stimulus such as a voltage or current, which is applied to the switchable flow material. The flow control system may be configured to perform a cleaning protocol. For example, if the switchable flow material tends to get stuck, a cleaning protocol may be used to clean the switchable flow material. The flow control system may also comprise a user interface. The flow system may also comprise a receiving unit, which is configured to receive information from a source. Such information could be e.g., a software update or any other information. For example, the receiving unit of the flow control system may be configured to receive information to start/stop a cleaning process, to start/stop the stimulus for the switchable flow material, etc. The information may be transferred to the writing instrument in any manner, e.g., via a cable or wireless.

The ink composition may comprise one or more of water, alcohol, and ester-based solvents. For example, the ink composition may comprise a water solution with 1 M KOH. In an example, the switchable flow material may be hydrophobic and configured to be switched to hydrophilic at an applied voltage of e.g., about −0.52 V and the ink composition may comprise a water solution with about 1 M KOH.

In any of the foregoing embodiments, the stimulus may be configured to switch the switchable flow material from the fluid flow preventing condition to the fluid flow enabling condition. The "at-rest" state is thus the state which does not require any energy and the "active" state is achieved by the stimulus. Energy may thus be needed during a writing process. In embodiments, only a short activation stimulus may be needed to switch the switchable flow material. In embodiments a continuous activation stimulus may be required.

Alternatively, the stimulus may be configured to switch the switchable flow material from the fluid flow enabling condition to the fluid flow preventing condition. In these embodiments, energy may be needed continuously to keep the writing instrument in an "at-rest" or "off" state. Once the writing instrument is used, the stimulus may be switched off, thereby enabling flow of the ink composition to or towards the writing surface.

In another aspect, the present disclosure provides a method of manufacturing a writing instrument comprising, in any order, one or more of the following steps. Obtaining one or more of the following components: a tubular body, a reservoir for an ink composition, a nib, and a switchable flow material. The switchable flow material is configured to switch between a fluid flow preventing condition and a fluid flow enabling condition by a stimulus (or vice versa). The method comprises the step of assembling the one or more components such that the switchable flow material is configured to control flow of the ink composition from the reservoir to a writing surface. The method further comprises (before, during, or after assembly) filling the reservoir with the ink composition. The method may also comprise refilling the reservoir with the ink composition after it is fully or partially emptied. The method may comprise applying a stimulus comprising electrical energy and/or thermal energy. The switchable flow material may comprise an electrowettable porous material, in particular a carbon nanotube porous or a carbon nanotube membrane. The method may further comprise assembling a power source, in particular a friction-based generator, in particular a triboelectric nanogenerator (TENG) to or into the writing instrument. The method may further comprise assembling a flow control system to or into the writing instrument.

In still another aspect, the present disclosure provides a method of using a writing instrument or instructions to use a writing instrument comprising one or more of the following steps. Providing a writing instrument according to the one of the above-mentioned aspects, switching the switchable flow material to the fluid flow enabling condition, applying the ink composition to a writing surface. The switching may be achieved by moving the nib over a writing surface. The writing instrument may comprise a friction-based generator, in particular a triboelectric nanogenerator (TENG), which generates electrical energy in response to moving the nib over the writing surface. The electrical energy switches the switchable flow material from the fluid flow preventing condition to the fluid flow enabling condition (or vice versa). The writing instrument may comprise a stored electrical energy and the switching may be achieved through electronic sensing and/or manual user operation. The method may further comprise during or after use the step of cleaning the writing instrument, in particular the step of cleaning the switchable flow material. The cleaning step may be performed by a flow control system. The cleaning step may be performed by rinsing with a cleaning solution such as water.

The foregoing methods are not intended to be limiting. To the contrary, each and every of the features described in context with a writing instrument may also be used in the method of manufacturing as well as in the method of using the writing instrument.

In any of the foregoing embodiments, the writing instrument may be a felt pen, a highlighter, a permanent or non-permanent marker.

DETAILED DESCRIPTION OF THE DISCLOSURE

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, the present disclosure is not limited to these specific embodiments.

Figure 1A:
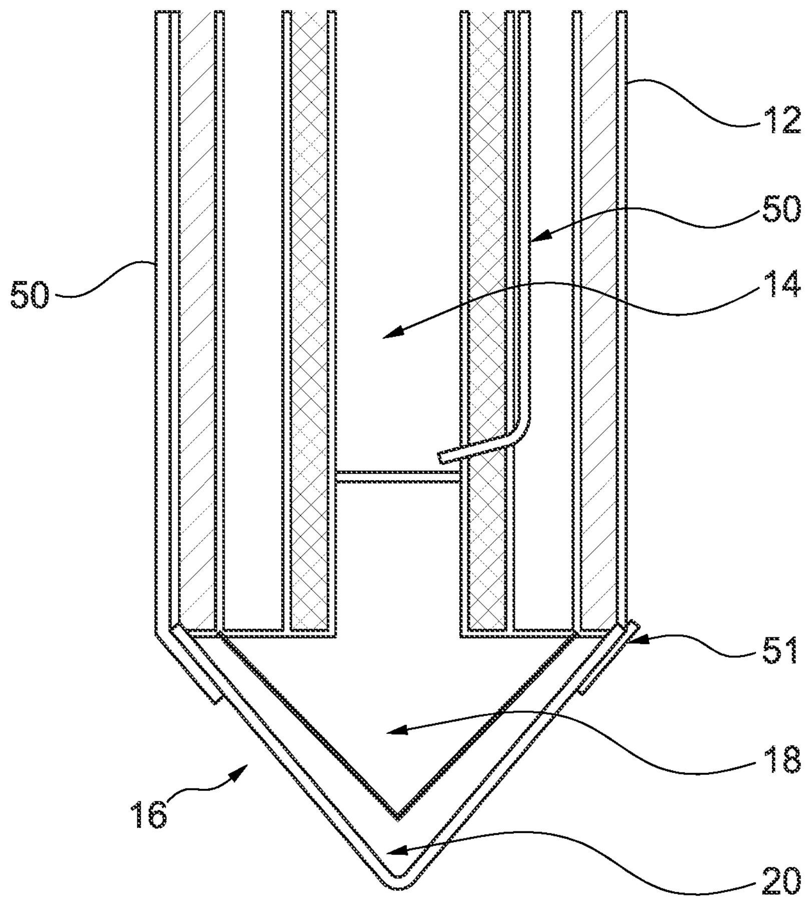
FIG. 1*a* shows an example of writing instrument according to the present disclosure.

FIG. 1*a* shows an example of writing instrument according to the present disclosure. The writing instrument may be a felt pen, a highlighter, a permanent or non-permanent marker. The writing instrument (10) comprises a tubular body (12). The tubular body may be a unitary body, or it may comprise multiple components. The writing instrument (10) further comprises a reservoir (14) for storing an ink composition. The reservoir is arranged proximally to the writing orifice within or as part of the tubular body (12).

The writing instrument (10) further comprise a nib (16) which is arranged distally to the reservoir (14). The nib (16) is in fluid communication with the reservoir (14). In some embodiments, the fluid communication may be established by a channel connecting the reservoir (14) and the nib (16) or by the nib (16) comprising a wick-like or porous element which extends into the reservoir (14) and is configured to transport ink from the reservoir (14) to the nib (16).

The writing instrument (10) further comprises a connecting circuitry (50) and a metal ring (51) such as a copper ring. As will be described in more detail below, the connecting circuitry (50) and the metal ring (51) are configured for delivering a stimulus to the switchable flow material (20) so that the material switches between a fluid flow preventing condition and a fluid flow enabling condition.

The nib (16) comprises a bulk material (18) and a switchable flow material (20). Shown in FIG. 1*a* is that the switchable flow material (20) substantially covers the bulk material (18) towards an exterior of the nib (16), but this arrangement of the switchable flow material (20) with respect to the nib (16) is not understood to be limiting. Instead, the switchable flow material (20) can also be arranged at other positions as will be described with reference to FIGS. 1*b* to 1*f*. The writing instrument as shown in FIG. 1*a* further comprises a connecting circuitry (50) with an electrode, which extends along the writing instrument into the ink reservoir (14) and with an electrode, which is coupled to the switchable flow material (20). In the example shown in FIG. 1*a*, the electrode is connected to the switchable flow material (20) via a metal ring (51), which may be made of copper. It is, however, not necessary to use copper. The material should be conductive, and in cases where the material is used as the substrate for CNT growth, it may be suitable for use in such manufacturing processes. Examples of these include aluminium/aluminium oxide, steel/stainless steel, iron, gold, nickle, chromium, molybdenum, graphite as well as alloys or mixtures of the above.

Figure 1B:
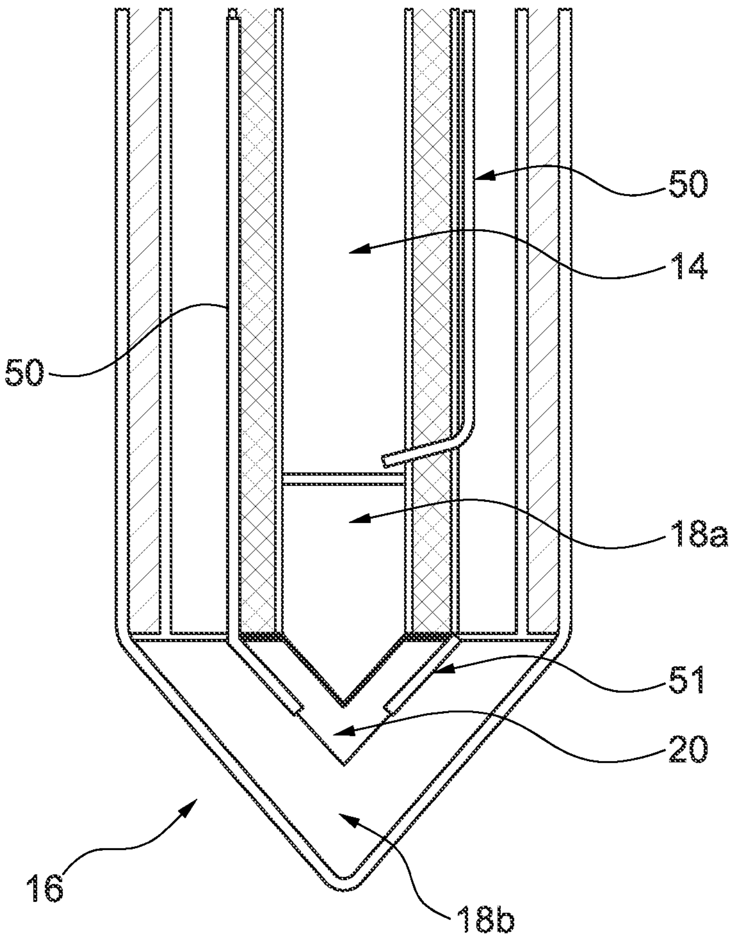
FIG. 1*b-f* show different arrangements of the switchable flow material with respect to the nib.

FIG. 1*b* shows that the switchable flow material (20) can also be positioned within the nib (16). In this example, the switchable flow material (20) is arranged between bulk material (18*a*) and bulk material (18*b*). Bulk material (18*a*) is arranged between the switchable flow material (20) and the ink in the ink reservoir (14) and bulk material (18*b*) forms the tip of the nib (16).

Figure 1C:
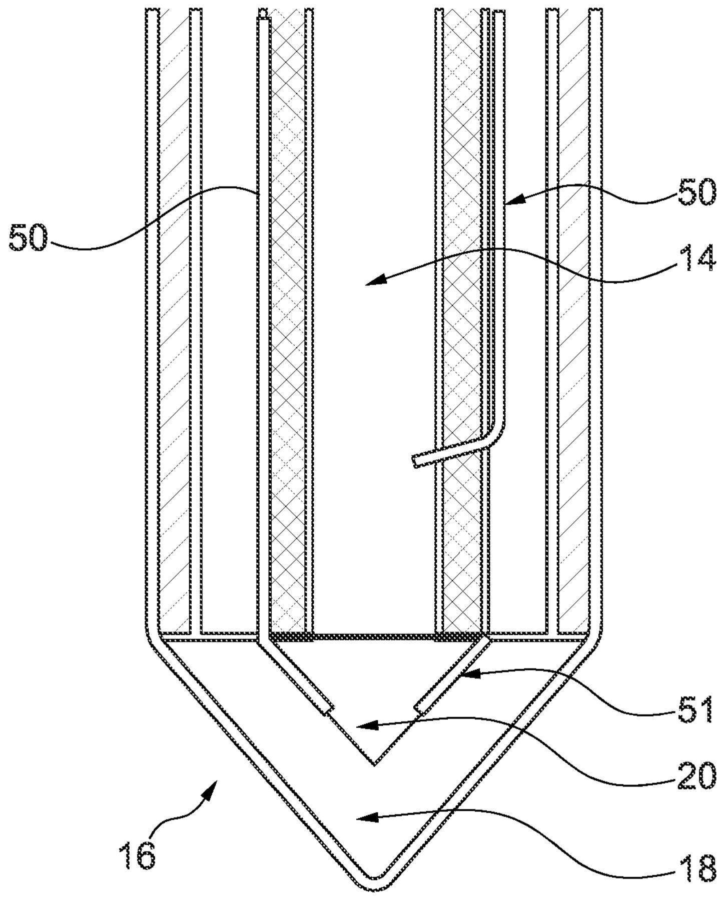

FIG. 1*c* shows an arrangement of the switchable flow material in a proximal portion of the nib (16). The switchable flow material (20) is in contact with the ink of the ink reservoir (14) and controls passage of ink through it before the ink enters the bulk material (18) of the nib (16)

Figure 1D:
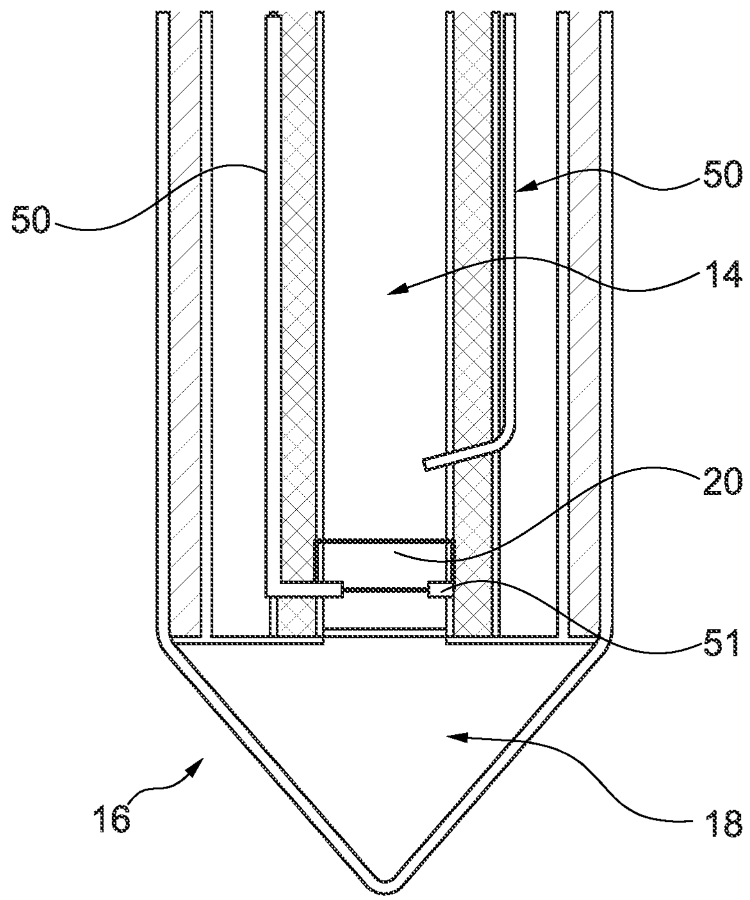

FIG. 1*d* shows an example in which the switchable flow material (20) is present as a separate component, i.e. in which the switchable flow material (20) is not part of the nib (18). As shown, the switchable flow material (20) is positioned proximally of the nib (16). In this example, the switchable flow material (20) is positioned internally within the ink reservoir (14)

Figure 1E:
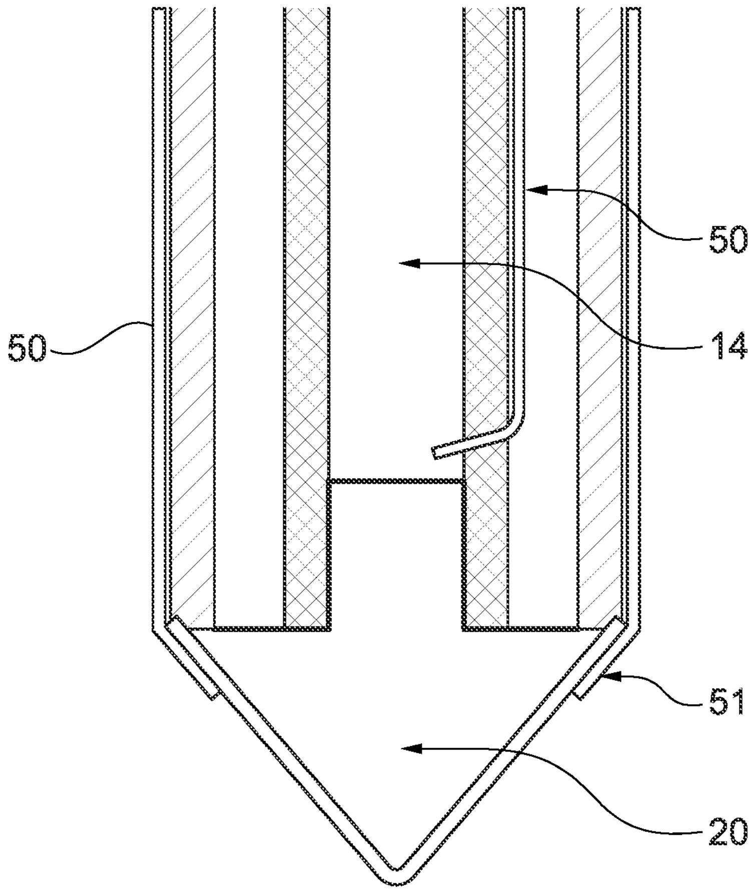

FIG. 1*e* shows that the switchable flow material (20) can also completely form the nib (16), i.e., the nib (16) may completely consist of the switchable flow material (20). In this example, no separate bulk material (18) is present.

Thus, there are numerous different arrangement of the switchable flow material (20) with respect to the nib (16). All arrangements of the switchable flow material (20) with respect to the nib (16) and reservoir (14) have in common that the switchable flow material (20) is arranged at a position, which allows the switchable flow material (20) to control flow of ink from the reservoir (14) to or towards a writing surface (100). In other words, the switchable flow material (20) is configured to control flow of the ink composition from the reservoir (14) to a writing surface (100). An arrangement of the switchable flow material (20) such that it at least partially covers the bulk material (18) (e.g., all surfaces of the nib, which face towards the exterior as shown in FIG. 1*a*) may be beneficial in that evaporation of the ink composition may be completely prevented or at least significantly reduced. Combinations of the different arrangements disclosed with reference to FIGS. 1*a* to 1*e* are also possible.

Figure 1F:
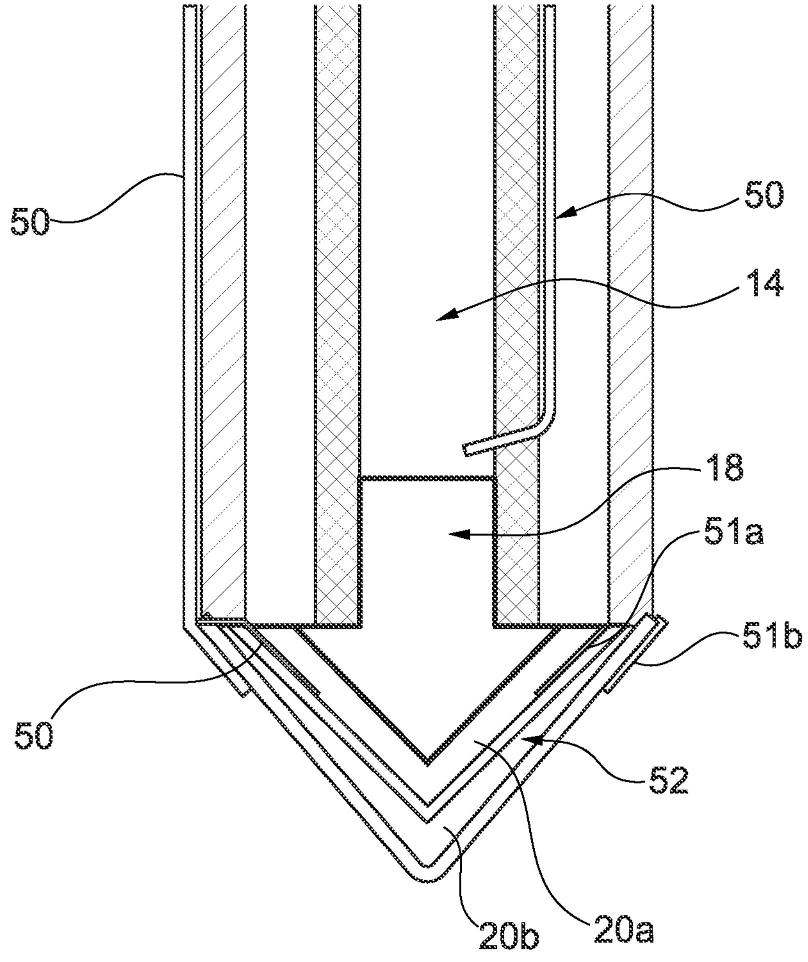

FIG. 1*f* shows an example in which the switchable flow material (20) may in addition or alternatively be arranged in the form of one or more layers or membranes at or near the nib (16). As shown, the switchable flow material (20*a*) is separated from switchable flow material (20*b*) by a porous electrically insulating layer (52). In many cases, the insulating layer may be the same as the 'bulk material', where the properties of the bulk material are electrically insulating and porous, such as many polymer foams, and pressed fiber materials used in felt tip pen products. For example, the insulating material may comprise for example PET foam, PTFE foam, polypropylene foam, pressed cellulose fibers or other natural fibres, or porous ceramic.

As can be seen in FIG. 1*f*, each of the layers of switchable flow material (20*a*, 20*b*) is coupled to a separate metal ring (51*a*, 51*b*) and connecting circuitry. The layers may be separately or together addressable by the stimulus. An arrangement of the switchable flow material (20) in layers or membranes may allow to tailor or fine-tune the switchable flow material (20). For example, a proximal layer or membrane of switchable flow material (20) may be configured for a rapid flow of ink composition through or across it in order to quickly fill the nib (16), whereas a distal layer or membrane of switchable flow material (20) may be configured to control release from the nib (18) to or towards the writing surface (100). The different layers of switchable flow material may be switched from one condition to the other with the same stimulus or with different stimuli. An electrically insulating layer and/or bulk material (18) may be provided between layers of switchable flow material (20). A flow control system (described in more detail below) may be configured to independently control the layers of switchable flow material (20). More advanced flow control functions may be provided in embodiments comprising two or more layers of switchable flow material (20). For example, a pumping of the ink composition may be achieved and flow rates beyond what is possible with a single layer of switchable flow material (20) may be achieved.

The bulk material (18) of the nib (16) is configured to transfer the ink composition from the reservoir (14) to or towards a writing surface (100). Standard materials for the bulk material (18) may be used for that purpose. The bulk material may transmit the ink using capillary, gravitational or other forces. An active pumping or positive pressure may not be required to transmit the ink composition from the reservoir (14) to or towards the writing surface (100). The bulk material (18) of the nib (16) may comprise one or more of fibers, a porous composite, a foam, a polyurethane foam, a cellulose material, a mineral material, a plastic material, an elastomer material, an hyperelastic material, an elastomer bead material, a bead material, and/or a natural material such as a cork or bast.

The switchable flow material (20) is configured to switch between a fluid flow preventing condition and a fluid flow enabling condition, which will be described in the following in more detail.

In the fluid flow preventing condition, the switchable flow material (20) at least partially or substantially prevents fluid flowing through it. In other words, in the fluid flow preventing condition, the switchable flow material (20) creates a barrier for the ink composition. Such a barrier effect for the ink composition may be achieved physically or mechanically (e.g., pores in the switchable flow material are closed) or chemically (e.g., by a change of a chemical property of the material). As an example, the switchable flow material may be hydrophobic in the fluid flow preventing condition. The terms "prevent" or "preventing" is not to be understood that a complete or 100% barrier for the ink composition is required. Rather, preventing also encompasses limiting, reducing, lessening, lowering, or minimizing flow of the ink composition across or through the switchable flow material (20).

In the fluid flow enabling condition, the switchable flow material (20) at least partially or substantially allows fluid to flow through it. In other words, the switchable flow material (20) allows ink from the reservoir (14) to pass through it to or towards a writing surface (100). Such a flow-passing effect for the ink composition may be achieved physically or mechanically (e.g., pores in the switchable flow material are open) or chemically (e.g. by a change of a chemical property of the material). As an example, the switchable flow material (20) may be hydrophilic in the fluid flow enabling condition.

Examples of switchable flow materials will be discussed further below.

The switchable flow material (20) is switched from one condition to the other by a stimulus, which will be described in the following in more detail. The stimulus comprises electrical energy and/or thermal energy.

In some embodiments, the stimulus is configured to switch the switchable flow material (20) from the fluid flow preventing condition to the fluid flow enabling condition. The "at-rest" state in these embodiments is thus the state which does not require any energy and the "active" state is achieved by the stimulus. Energy may thus be continuously needed during a writing process. Some embodiments may only require an activation stimulus to switch the switchable flow material (20) to the fluid flow enabling condition. In these embodiments, the switchable flow material (20) changes its properties permanently (or at least transiently) to allow flow of the ink composition from the reservoir (14) to or towards the writing surface (100). In other embodiments, a continuous activation stimulus may be required in order to keep the switchable flow material (20) in the fluid flow enabling condition.

In alternative embodiments, the stimulus is configured to switch the switchable flow material (20) from the fluid flow enabling condition to the fluid flow preventing condition. Some embodiments may require a single stimulus to switch the switchable flow material (20) to the fluid flow preventing condition. For example, a single stimulus may result in a more or less permanent change of a physical or chemical property of the switchable flow material (20), thus preventing or reducing flow of ink through it. In other embodiments, a more continuous stimulus may be needed in order to keep the writing instrument in an "off" state. In such examples, once the writing instrument (10) is used, the stimulus may be switched off, thereby enabling flow of the ink composition from the reservoir (14) to or towards the writing surface (100).

In the following several examples for switchable flow materials will be provided, which can be switched from a fluid flow enabling condition to a fluid flow preventing condition (or vice versa) by a stimulus. These materials are all suitable for the present invention and can be arranged such that these control ink flow from the reservoir to or towards the writing surface. For example, the materials can be arranged as discussed above with reference to FIGS. 1*a-f*.

The switchable flow material (20) can be a porous material. The porous material comprises a bulk material with pores which have a controllable interaction with a fluid such as ink when the porous material is changed between at least two possible states. The porous material may consist of a material with continuous interconnected network of open pores such that a fluid such as ink can travel from one side of the material to the other and such that this travel occurs via capillary forces either passively or upon the action of a stimulus. The fluid interaction control may be achieved by embodiments of the porous material with changeable pore size via material compression stimulus, shape change induced by a thermal stimulus, or electrical charge forces by application of electrical stimulus. The achievable states by application or removal of the stimulus are sufficient to enable flow of a fluid to the writing surface, and in another state, increase the flow resistance such that capillary forces created by the removal of a fluid from the far side of the porous material layer (i.e. by writing) are insufficient to draw further fluid from the internal reservoir. Alternatively, the second state may achieve resistances which do not arrest flow due to capillary forces from writing but do prevent or reduce evaporation of fluid from the internal reservoir through the layer. Preferably the material is in the second state (hydrophobic or otherwise resistant to fluid flow) at rest (without application of stimulus) to prevent or minimize imbibition of fluid. The porous material is arranged such that it intervenes between an ink reservoir and the surface of a writing device, and may be in the form of a layer or a membrane or it may completely form the nib. As discussed above, an arrangement in layers or membranes may allow to tailor the flow properties of the ink composition to or towards the writing surface. The porous material may be an electrowettable porous material.

The switchable flow material can be a conductive carbon-based porous material, in particular carbon nanotubes (CNT). The carbon nanotubes may be provided in a carbon nanotube porous material or a carbon nanotube membrane material. The CNT structures may be multi-walled Carbon Nano Tubes (MWCNT) which comprise the sponge material and may have sufficient length and thickness to create a bulk material with open interconnected pores and an interconnected network of conductive MWCNTs. MWCNT length scales of 1-100 micrometers and thicknesses of 10-200 nm are preferable, with the ratio of thickness to length not being under at least 1:50. The porous material may be manufactured by any suitable means such as chemical vapor deposition onto a copper substrate. CNT porous materials or sponges can be lightweight, conductive, highly porous, and flexible and are suitable for constructing high-performance electrocapillary imbibers. Preferably, the porosity and conductivity of the material must be such that the effect of a suitable voltage stimulus of between −2 and 2V is sufficient to initiate or arrest imbibition of fluid when applied between the porous material and an imbibed fluid with electrolyte. A CNT sponge material is fibrous in nature and therefore has no 'pores' but can be assigned an effective pore radius based on average void sizes between agglomerations of CNTs.

The effective pore sizes may range between 5-2000 nm. At sizes below this, boundary interaction effects are expected to reduce flow rate through the porous material, and at sizes above this the effect of the voltage stimulus is expected to be negligible on flow rate through the pores. Water imbibition into CNT porous materials or sponges can be initiated at low potentials created between the imbibed fluid containing an electrolyte and the porous material with tunable uptake rates created by varying voltage amplitude enabling the flow to be actively modulated and switched on and off reversibly. The wetting properties of conductive CNT sponges can be manipulated employing the electrocapillary technique, whereby the application of a voltage stimulus to the porous material may be able to affect the molecular charge interactions of the bulk material (walls of the pores) with the constituents of the fluid held within the pores, therefore effective contact angle with fluid held within or against the sponge at all contact points. The porous material must also be arranged relative to a power source such that there is electrical connectivity between the porous material and a power source, creating a voltage potential between the fluid and the porous material. This connectivity for example may be achieved by using the initial copper substrate upon which the CNT porous material was grown as a contact point, or by subsequently bonding or compressing the material against a conductive structure. The contact point must be not in direct contact with the ink when the actively switched state is desired, It therefore may be located on the outer side of the CNT porous material layer with respect to the ink reservoir. Reversible on-off switchable control on the capillary flow in CNT porous materials or sponges can be realized using ultra-low electric voltages, see Li et al, Procedia IUTAM 21 (2017) 71-77, which is hereby incorporated by reference.

The switchable flow material can be graphene, in particular a graphene oxide membrane. This material embodiment may be arranged such that a graphene or graphene oxide membrane is sandwiched between two conductive (e.g. metal) electrode layers, where each layer is permeable to water at rest. The sandwiched porous material membrane may consist of stacked planar layers of graphene or graphene oxide which are interconnected by electrically conducting structures such as carbon filaments. The flow may be arrested by application of a voltage between the two electrodes of a magnitude between 20 and −20V and preferably within 2 and −2V. Particular differences from the CNT based porous material to note include that the mechanism may arrest the flow of pure water and requires no conductive electrolyte in the controlled fluid. As with the above embodiment, the porous membrane may be continuously conductive across the membrane which intervenes between the fluid reservoir and the writing surface. Suitable thickness of the porous material layer is expected to be at least 100 nm for mechanical stability. Graphene and carbon-based nanomaterials can be highly efficient adsorbents for oils and organic solvents, see Wan et al, Nanotehnol Rev 2016; 5(1): 3-22, which is hereby incorporated by reference. Graphene oxide membranes can arrest flow when saturated with water. Electrically controlled water permeation through graphene oxide membranes is described in detail in Zhou et al, Nature 559, 236-240 (2018), which is hereby incorporated by reference.

The switchable flow material can be an auxetic structure or a structure with a negative Poisson's ratio. Auxetic materials, structures, are materials that exhibit an unexpected behavior when they are subjected to mechanical stresses and strains. When they are stretched in the longitudinal direction, they become thicker in one or several of the perpendicular width-wise directions. The same logic applies in the opposite way: when they are subjected to uniaxial compression, they display a "thinning" in one or several of the transverse directions Auxetics are materials with a negative Poisson's ratio. The Poisson's ratio is defined as the negative ratio of transverse (or lateral) to longitudinal (or axial) strain; and relates how a material deforms in one direction, when it's actively deformed in a perpendicular direction to the first one by means of the application of a mechanical stress/strain. That effect can be induced in a particular material by means of altering its internal (micro)structure and making it properly cooperate with the way the material deforms when loaded. This is done by means of modifying and geometrically fine-tuning it. By this appropriate deformation modes and mechanisms are obtained upon mechanical solicitation of the material. A specific microscopic structure in the auxetic materials is important for maintaining a negative Poisson's ratio. Therefore, the nib of the writing instrument can be composed of such auxetic material and structure such that when an external stimulus occurs (e.g., force exerted to the nib while writing, or a temperature variation) the void spaces that exist within the structure collapse or widen to restrict or increase respectively the flow of the ink/pigment. Auxetics can be single molecules, crystals, or a particular structure of macroscopic matter. Such materials and structures are expected to have mechanical properties such as high energy absorption and fracture resistance. An auxetic structure may be designed and fabricated to control flow of a liquid. The auxetic material can comprise natural layered ceramics, ferroelectric polycrystalline ceramics, zeolite, metals with cubic lattice, hierarchical laminates, polymeric and metallic foams or microporous polymers.

The auxetic structure of the nib can be made of auxetic cellular solids, microporous auxetic polymers, molecular auxetic materials, auxetic composites, polymer foams, highly porous rocks, or even Graphene, which can be made auxetic through the introduction of vacancy defects. Such structures can take a pristine auxetic structure design, re-entrant designed (also referred to as 'bow-shaped' or 'accordion') honeycomb, or even diamond-fold design in a 3-dimensional configuration that matches the typic structure of writing instruments. The nano- or micro-voids created by such structures and designs is what allows the ink/pigment to flow through. In the case of switchable flow materials that may comprise a thermoactivated polymer and/or a shape-memory material that are thermosensitive their state can be switched from one configuration to the other by a change in temperature. This change in temperature is created through an embedded to the nib coil that in turn is connected to a power source also embedded to the writing instrument which, when powered, increases the temperature (of the coil) and activates the auxetic structure to either reduce the void volumes (i.e., restrict fluid flow) or increase the void volumes (i.e., release fluid flow) based on the orientation and structure of the auxetic used. In other words, the temperature variation resolution can control the amount of the fluid flowing through the voids of the auxetic structure. In the case where the switchable flow material is activated through axial or perpendicular force applied to the nib, then the auxetic structure controls the fluid flow through the amount of force exerted to it by simply restricting or releasing the nano-micro-voids within the structure.

Suitable thermoactivated polymers can be in the form of a solution, a gel, self-assembling nanoparticles, a (multi-layer) film or a solid material. Examples for suitable thermoactivated polymers are polymer-carbon nanotube composites, dielectric elastomer actuators (DEAs), elastomeric polymers such as thermoplastic polyurethane (TPU), cross-linked polyethylene, polycaprolactone (PCL) and polynorbornene), Ethylene-Vinyl Acetate, polyester-urethanes. Suitable shape memory metals are for example NiTi, CuAlNi and CuZnAl. It is also possible to use shape memory materials, which are not thermoactivated, such as liquid crystalline (LC) elastomers The switchable flow materials have in common that these can be designed and arranged such that they have a tendency or property to substantially allow fluid flow in a fluid flow enabling condition and to prevent fluid flow partially or substantially in a fluid flow preventing condition.

In addition, the writing instrument (10) may comprise a protective material which at least partially covers the nib or the switchable flow material (20). The protective material is not shown in FIG. 1. A protective material is particularly envisaged for embodiments, in which the switchable flow material is arranged towards the outside of the nib. In such embodiments, the protective material may protect the switchable flow material (20) from mechanical damages, which may for example occur during writing or using the writing instrument (10). The protective material may be the same material as the material of the nib or a modified form of the material of the nib. The protective material may form a layer of about 0.3 mm to about 15 mm.

The present disclosure is not limited to a nib (16) with a specific shape or size. To the contrary, the nib may have any size and shape, which may be selected depending on the desired writing characteristics of the writing instrument (10). For example, a width of the nib may be from about 0.3 mm to about 15 mm. Larger and smaller nibs (16) are also possible.

As discussed above, a stimulus is applied to the switchable flow material (20) to switch it from a fluid flow enabling condition to a fluid flow preventing condition (or vice versa). The writing instrument (10) therefore comprises a power source. The power source is not shown in FIG. 1. The power source may be an element, which stores the energy for the stimulus, or, it may be an element, which generates the energy for the stimulus. The power source may thus be seen as the origin of the energy for the stimulus, which switches the switchable flow material (20) from one condition to the other condition. The energy for the stimulus may be stored in the power source. The energy may be an electrical energy and the power source a battery. The energy for the stimulus may be generated in the power source. The energy may be an electrical energy and the power source a generator. The energy stored or generated in the power source may be used directly or indirectly for the stimulus. For example, the energy may be an electrical energy and the stimulus may be an electrical stimulus. As another example, the energy may be electrical energy, which is converted to thermal energy and the stimulus comprises a thermal stimulus. The power source may also store or generate thermal energy, which may be used for a thermal stimulus. Thermal energy may be generated for example via converting electrical energy to thermal energy or via a chemical reaction (for example an exothermic reaction).

The stimulus is transferred to the switchable flow material in any suitable manner. For example, if the stimulus is an electrical stimulus, the electrical energy can be transferred from the power source to the switchable flow material via conductive components. In another example, if the stimulus is a thermal stimulus, the electrical energy can be transferred from the power source via conductive components to a heating element, which is at or near the switchable flow material.

The writing surface (100) is the surface of the substrate on which the ink composition can be applied with the writing instrument (10). The writing instrument (10) in accordance with the present disclosure does not require any special characteristics of the writing surface. As such, the writing surface (100) can be the surface of any substrate. The substrate may be a paper material, a fabric material, a plastic material, a glass material, a metal material, a ceramic material, a stone material, a wood material, a natural material, or a non-natural material.

The writing instrument (10) in accordance with the present disclosure does not require any special characteristics for the ink composition. Any ink composition may be used and comprise one or more of water, alcohol, and ester-based solvents. For example, the ink composition may comprise a water solution with 1M KOH. The ink composition may be stored in the reservoir (14). The reservoir (14) may be refillable or not. It may be filled during or after manufacturing and may be re-filled after it is empty. The ink composition may comprise standard pigments such as titanium dioxide, optionally surface-treated, zirconium or cerium oxides, zinc oxides, iron (black, yellow or red) oxides or chromium oxides, manganese violet, ultramarine blue, chromium hydrate and ferric blue, and metal powders such as aluminum powder and copper powder. The ink composition may also comprise organic pigments such as carbon black, pigments of D & C type, and lakes based on cochineal carmine, on barium, on strontium, on calcium and on aluminum.

The writing instrument (10) may further comprise a flow control system. The flow control system is not shown in FIG. 1*a*. Preferably, the flow control system allows to digitally control the stimulus for the switchable flow material. The flow control system may be configured to modify, change, and/or select the stimulus. The flow control system may for example be used to control the switching of the switchable material from a fluid flow preventing to a fluid flow enabling condition or vice versa. The flow control system may also be configured to change the stimulus such that the properties of the switchable flow material are adjusted. For example, depending on the energy level of the stimulus, the switchable flow material may allow or prevent more or less flow of the ink composition through it. In other words, a higher (or lower) stimulus may be used to e.g., further open (or close) pores in the switchable flow material to allow more (or less) ink composition to pass through. With that the writing characteristics of the writing instrument (10) may be adjusted before or during using the writing instrument (10). For example, a user may wish to use the same writing instrument (10) for thin as well as thick lines during writing or coloring. Adjusting the flow rate of the ink composition via adjusting the stimulus (e.g., its intensity, strength, or duration, number of "activated" layers of switchable flow material) for the switchable flow material may thus allow to change the writing characteristics of the writing instrument (10). The flow control system may comprise selectable settings of the power source, such that different stimuli may be applied, whereas the different stimuli may consist of different voltage levels (for example −0.2V, −0.4V, −0.6V, etc.). The different stimuli may correspond to a different resistance to fluid flow and therefore a different line width or ink volume deposited onto the writing surface.

A button, slider, or any other mechanical or digital user interface may be provided, which allows to select or adjust the stimulus. The flow control system may be configured to control the stimulus such as a voltage or a current, which is applied to the switchable flow material. The flow control system may also be configured to perform a cleaning protocol. Over time, deposited ink solutes or other substances may build up in the switchable flow material requiring a wash to be performed to return the material to original functionality (e.g., maximum difference between hydrophobicity states), such as rinsing with water. A cleaning protocol may include actuation of the switchable flow material (e.g., to the hydrophilic state) to displace trapped substances while the nib is exposed to a liquid. The cleaning protocol may comprise flushing or rinsing with a liquid such as water, pure water, ethanol, solvents, and/or ink composition.

The flow control system may also comprise a digital user interface. The flow control system may also comprise a receiving unit, which is configured to receive information from a source (e.g., a database). Such information could be e.g., a software update or any other information.

For example, the receiving unit of the flow control system may be configured to receive information to start/stop a cleaning process, to start/stop a stimulus for the switchable flow material, etc. The information may be transferred to the writing instrument in any manner, e.g., via a cable or wireless. A writing instrument (10), which is configured such that the stimulus is controlled from externally (in particular in a remote or wireless manner) may be useful in that it allows e.g., to switch the writing instrument on/off from externally. It may be desirable to switch one or more writing instruments off to improve the storage condition(s) of the writing instrument(s), or to prevent user(s) continues to use the writing instrument for writing (e.g., in an exam situation). It may also be desirable to change/modify/adjust the stimulus for the writing instrument from externally, e.g., to change the width and/or volume of ink deposited on the writing surface.

Figure 2:
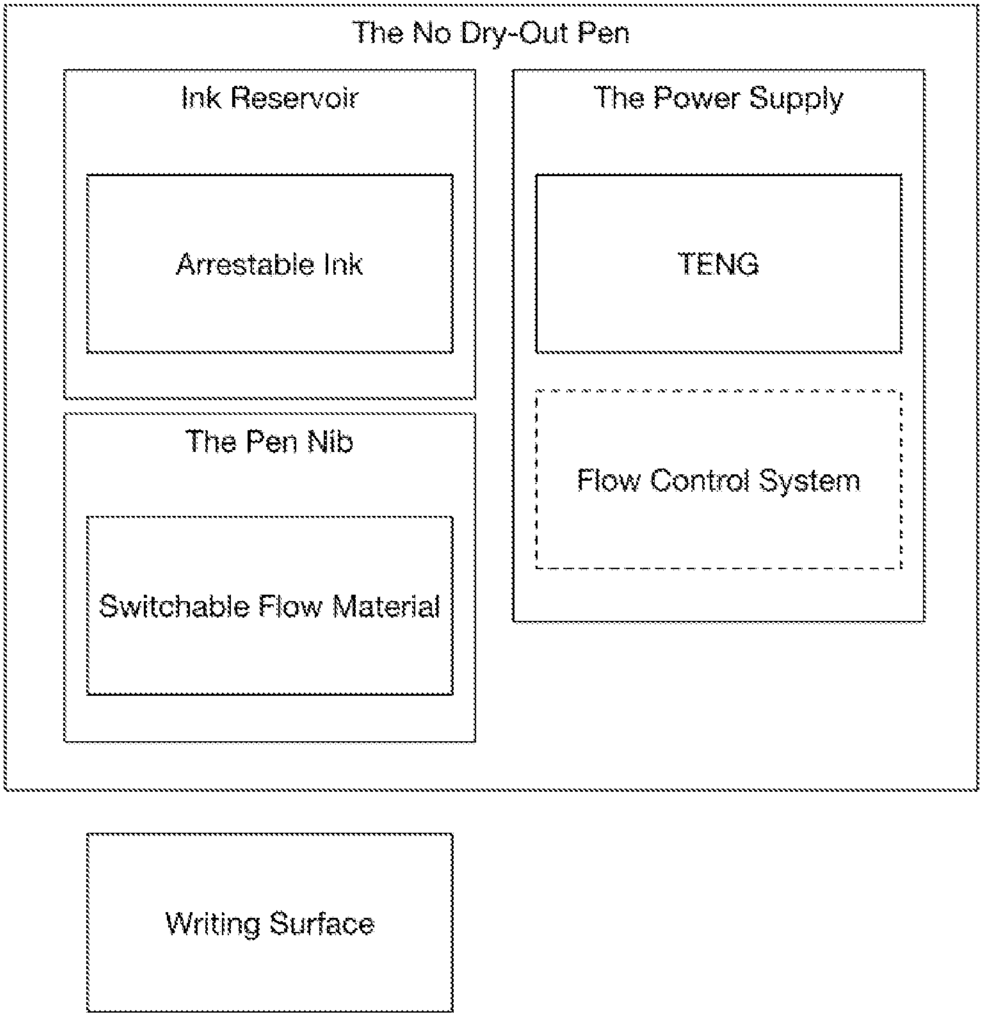
FIG. 2 shows a schematic overview of components of a writing instrument according to the present disclosure.

FIG. 2 shows a schematic overview of components of a writing instrument according to the present disclosure. Neither the components shown, nor the terminology used in FIG. 2 are intended to be limiting. For example, FIG. 2 refers to a triboelectric nanogenerator (TENG) as being part of the Power Supply (which is the same as the above-described power source). As mentioned above, a generator is only an example and the power source may in addition or alternatively comprise a battery.

As can be seen in FIG. 2, the writing instrument comprises an ink reservoir, a pen nib comprising a switchable flow material, and a power supply (or power source). In the example of FIG. 2, the switchable flow material is comprised by the pen nib. As discussed above, the switchable flow material could also be arranged at other positions as shown in FIGS. 1*a-f*, e.g., between the ink reservoir and the pen nib. In the example of FIG. 2, the power source comprises a triboelectric nanogenerator (TENG), which will be described in more detail below. The flow control system of the example of FIG. 2 is shown as being comprised of the power supply. This, however, is not intended to be limiting. The flow control system may by a separate system and may comprise a user interface (mechanical or digital).

Figure 3:
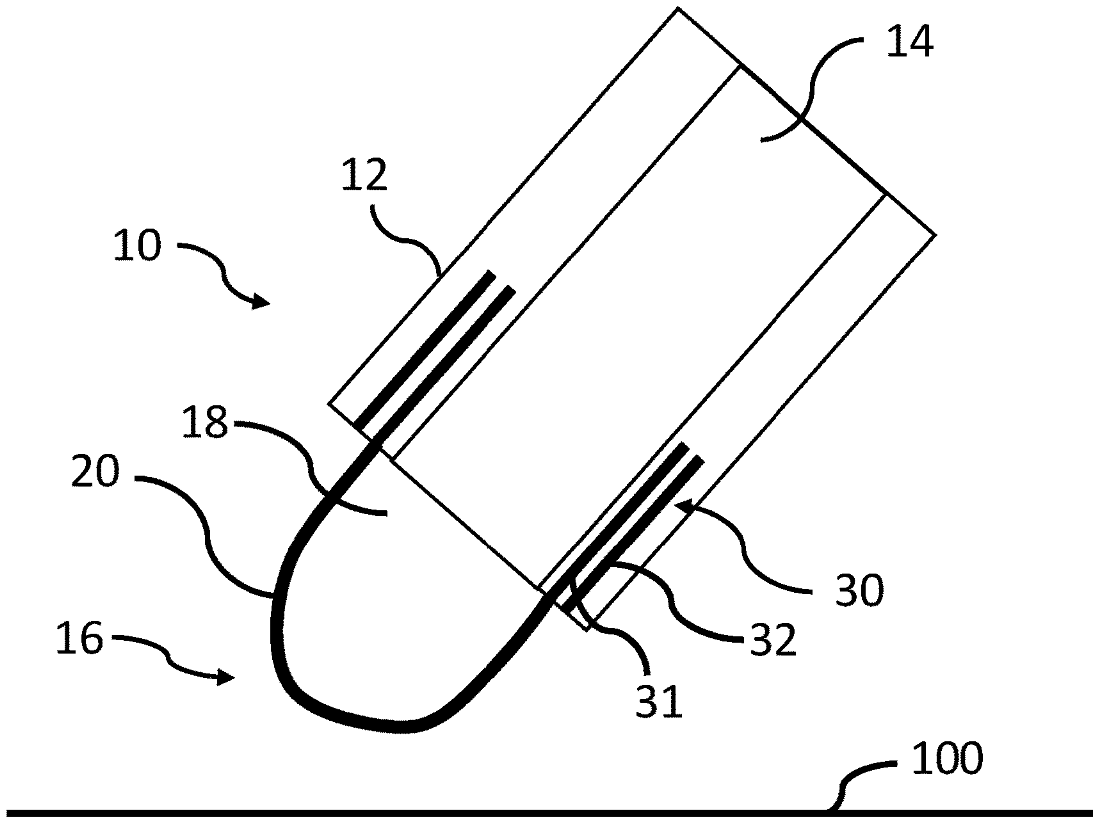
FIG. 3 shows an example of a writing instrument comprising a friction-based generator and a nib with a switchable flow material.

FIG. 3 shows an example of a writing instrument (10) comprising a power source (30) in the form of a friction-based generator in accordance with the present disclosure. A friction-based generator in general can produce or generate power from friction. Examples for friction-based generators are triboelectric nanogenerators (TENGs), which can be a flexible power source, see Wang et al, npj Flexible Electronics (2017)1:10, which is hereby incorporated by reference. A friction-based generator or TENG module may be configured to produce or generate power from friction at very high voltages compared to other power scavenging methods. A friction-based generator or TENG module may thus be used to provide a passively powered writing instrument. Together with an electrowettable porous material, a friction-based generator or TENG module may be used to provide a writing instrument, which does not require a user action to "activate" the writing instrument. An unmodified friction-based generator or TENG module structure may be used as described in the literature, see e.g., Wang et al, npj Flexible Electronics (2017)1:10, which is hereby incorporated by reference. The TENG may act as a direct power source to the switchable flow material. In general, TENGs are able to produce a high voltage and reasonably high power densities from physical motion. Nie et al describe a self-powered microfluidic transport system based on TENGs and electrowetting technique, see Nie et al in ACS Nano 2018, 12, 2, 1491-1499, which is hereby incorporated by reference. The output of a TENG can be further enhanced by staggered electrodes as described by Lee et al in Nano Energy Volume 86, August 2021, 106062.

Typically, a TENG contains two different materials that are assembled face to face. When the two materials are in contact, opposite static charges appear on the surfaces due to contact electrification. In addition, the back side of the materials comprise an electrode. The charges can flow between two electrodes through an external circuit and a potential difference is created as the materials are separate. A TENG may comprise two different polymer sheets that are assembled as a sandwiched structure. The surface of the film may have nanoscale roughness structure, which can produce friction. A thin Au film may be deposited on the back of the polymer sheet. When an external force bends the polymer films, two films touched each other. Owing to nanoscale surface roughness, opposite charges emerge and distribute on the two surfaces of the films because of the contact electrification. Simultaneously, interface dipole layers are generated, which can give rise to inner potential layer between the two electrodes. The TENG embodiment may vary significantly in structure and material choices for different TENG physical movement power generation mechanisms which may be used, such as sliding, contact/separating, or flexural. Many materials can be used in TENGs, such as polyamide, polyimide, polytetrafluoroethylene (PTFE), polyvinylidene fluoride (PVDF), and silk.

In the example shown in FIG. 3, the friction-based generator or TENG module is positioned at a distal end of the tubular body (12). This position, however, is not intended to be limiting and other arrangements are also possible. The friction-based generator or TENG module comprises a first layer (31) and a second layer (32), which are arranged face to face. Preferably, the first and second layers are comprised of different materials. The first layer (31) and the second layer (32) are slidable relative to one another. As can be seen in FIG. 3, the first layer (31) and the second layer (32) are arranged in the distal portion of the tubular body (12) of the writing instrument (10). One of the layers of the friction-based generator or TENG module may be attached to the housing of the tubular body (12) or it may be the housing of the tubular body (12), i.e. the housing forms one of the layers of the friction-based generator or TENG module.

The nib (16) is arranged near the friction-based generator or TENG module. Preferably, the nib (16) is directly or indirectly coupled or connected to one of the layers of the friction-based generator or TENG module. Preferably, a portion of the nib (16) is coupled or connected to one of the layers of the friction-based generator or TENG module such that movements of the nib (16) are translated to the layer such that the layer slides relative to another layer of the friction-based generator or TENG module and thus generate energy. Most preferably, a portion of the nib (16) is connected to at least an inner layer of the friction-based generator or TENG module. The friction-based generator or TENG module is arranged around the base of the nib (16), which flexes due to forces applied at the tip of the nib (16). These flexural forces can then be harnessed for power generation by diving interfacial movement between the layers/electrodes.

The energy generated by the friction-based generator or TENG module is used as the stimulus for the switchable flow material (20). For that purpose, the energy is either directly transferred to the switchable flow material (20), which therefore is connected to one or more of the layers of the friction-based generator or TENG module. The writing instrument (10) may comprise conductive components to transfer electrical energy from the power source to the switchable flow material (20). Conductive components may be used to transfer the energy from the friction-based generator or TENG module to the switchable flow material (20). The writing instrument (10) may further comprise capacitive components to process the output from the power source. Capacitive components or batteries may be used to process the output from the friction-based generator or TENG module. A processing of the output may be beneficial for delivering a consistent stimulus with no, or only limited interruptions during use of the writing instrument (10), such as a brief pause in writing. The power source (battery and/or generator) may be configured to deliver a low voltage to the switchable flow material (20), in particular a voltage between −2 V to +2 V, in particular −1.5 V to +1.5 V, more particularly a voltage between −0.5 V to 1 V.

Figure 4:
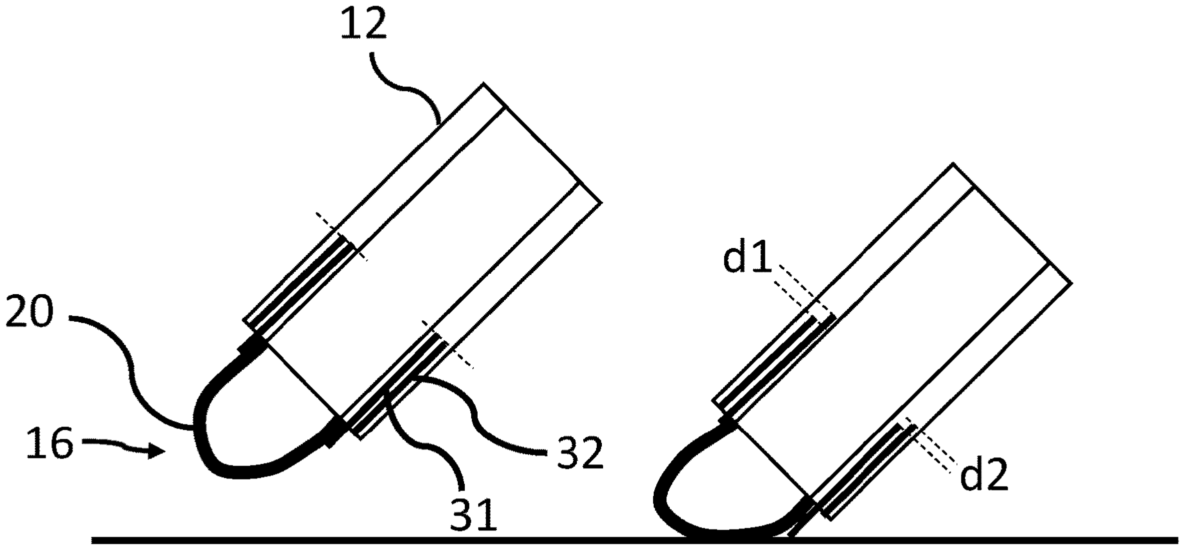
FIG. 4 shows the flexing of a nib of a writing instrument during use.

FIG. 4 shows in a highly schematic manner the flexing of a nib of a writing instrument during use. Flexing of the nib results in layers of the friction-based generator or TENG module to be slidingly displaced relative to each other. This result in a stimulus for the switchable flow material, which thereby switches to a fluid flow enabling condition. Thus, friction and bending stresses on the nib, which occur e.g., during writing, are translated from the nib to the friction-based generator or TENG module and generate energy. This energy is used as the stimulus for the switchable flow material, e.g., the energy is used to switch the switchable flow material to a fluid flow enabling condition.

On the left side, FIG. 4 shows a writing instrument (10) comprising a switchable flow material (20) at the nib (16) and a friction-based generator (e.g., a TENG) comprising a first layer (31) and a second layer (32). In the example of FIG. 4, the first layer (31) is connected to the nib (preferably to the switchable flow material). In FIG. 4, the first layer (31) protrudes outwardly of the tubular body (12) but this is not necessary. On the right side, FIG. 4 shows the writing instrument (10) during use. As can be seen in the highly schematic drawing, the nib (16) flexes and slightly dislocates the first layer (31) with respect to the second layer (32) by a distance d1 and d2 on opposing sides. It is noted that the layers may be continuous layers around the circumference (i.e., form a tubular layer) or multiple pieces of separate first layers and/or second layers may be used. The displacement d1 and/or d2 preferably are selected to be sufficient such that an electrical energy may be generated in the friction-based generator or TENG module. The displacement depends on the materials used for the friction-based generator or TENG module and/or the materials of the nib and/or switchable flow material. A displacement of the layers may not be required at all and instead a pressure exerted on a friction-based generator may be sufficient to generate energy.

The friction-based generator or TENG module may be arranged in the distal portion of the tubular body (12) and a portion of the nib (16) may be connected to at least an inner layer of the friction-based generator or TENG module. This position of the friction-based generator or TENG module, however, is not intended to be limiting and other positions are also possible. The switchable flow material (20) of the nib (16) may be connected to a layer of the friction-based generator or TENG module. The writing instrument (10) may be configured such that bending forces of the nib (16) and/or movements of the nib (16) relative to the tubular body (12) are transferred to an inner layer of the friction-based generator or TENG module, thereby generating electrical energy for switching the switchable flow material (20). In other words, a movement of the nib (16) may cause a movement of a layer of a TENG, thereby generating a stimulus for the switchable flow material (20). The switchable flow material (20) may then switch from a fluid flow preventing condition to a fluid flow enabling condition.

In addition, or alternatively, the power source may comprise a battery. A friction-based generator or TENG module may then not be required and the stimulus for the switchable flow material may derive from the battery. A user may thus simply activate the switchable flow material by pressing a button. A battery may also be used in addition to a friction-based generator or TENG module. A battery or any other capacitive component may be advantageous to process the output of the friction-based generator or TENG module. For example, the stimulus may be more consistently delivered without interruptions when using a friction-based generator or TENG module in combination with a battery or capacitive component.

Activation of the switchable flow material (20) may also be achieved by a sensor, which is configured to detect that a user is about to use the writing instrument or is using the writing instrument. Such a sensor may comprise a motion sensor, an orientation sensor, a conductive sensor, a temperature sensor, a force sensor, a gravitation sensor, a hygroscopic sensor, a heartbeat sensor, and/or a photosensor or any other sensor, which is suitable to detect that a user is about to or is using the writing instrument. An artificial intelligence (AI) may also be used to predict that a user is about to start using the writing instrument. For example, if a user shows a certain habit such as using the writing instrument regularly at a certain time point, such information may be used to predict a future use of the writing instrument. The AI may thus be used to "prepare" the writing instrument for use and activate the switchable flow material.

Figure 5:
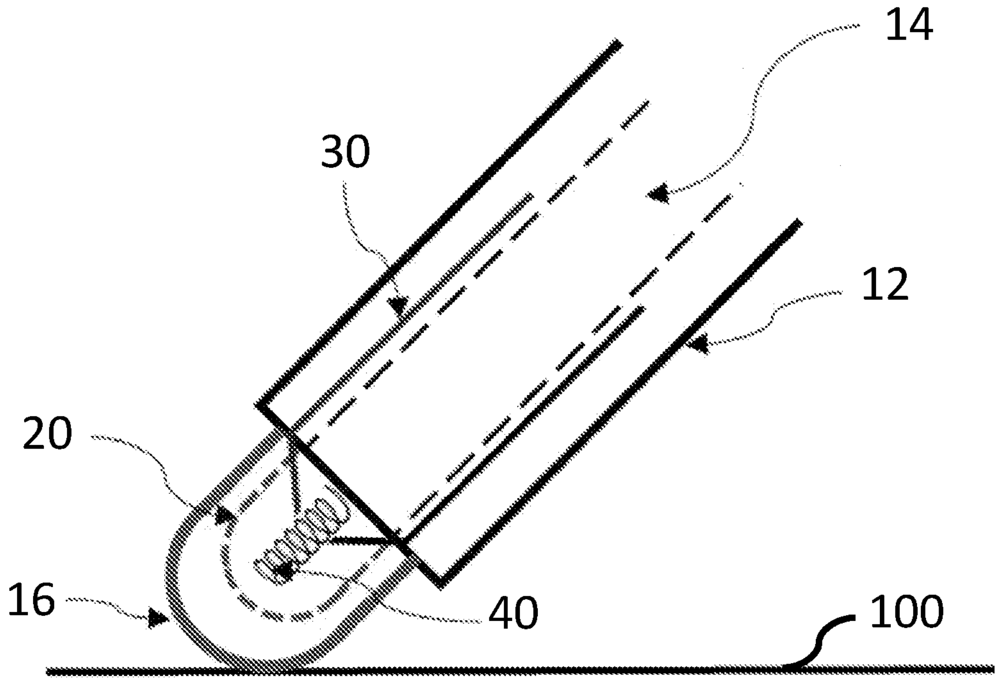
FIG. 5 shows an example of a writing instrument comprising a heating element and a nib with a switchable flow material.

FIG. 5 shows an example of a writing instrument (10) comprising a heating element (40). The heating element (40) may be an additional element for any of the above-described embodiments. The heating element (40) may be configured to convert electrical energy to thermal energy. The heating element (40) of this example is used to switch a switchable flow material (20) from a fluid flow enabling to a fluid flow preventing condition or vice versa. The thermal energy can be used to change the shape and/or configuration of an auxetic structure or shape memory material. The energy for the heating element (40) derives from a power source such as a battery or a generator. A friction-based generator or TENG module may be used to generate heat via a resistive element. As discussed by Wang et al, npj Flexible Electronics (2017)1:10, which is hereby incorporated by reference, a TENG can be relatively efficient in converting kinetic energy to electrical energy and is thus also suitable for generating thermal energy. The heating element may be a heating coil as shown in FIG. 5. It may, however, be any element, which is configured to radiate thermal energy. For example, the heating element may be an element which generates thermal energy by a chemical reaction (e.g., an exothermic reaction). Preferably, the heating element generates thermal energy in response to electrical energy.

The switchable flow material (20) of the embodiment of FIG. 5 comprises a material, which is responsive to a change in temperature, e.g., an auxetic structure or shape memory structure. Although the switchable flow material (20) is shown to be positioned within the nib (16) it could—as discussed above—also be arranged at a different position as shown in FIGS. 1*a-f*. For example, the structure could form a proximal or distal portion of the nib (16) or could form the nib (16). It has to be emphasized that the embodiment of FIG. 5 can also include one or more of the features described above (e.g., power source, flow control system, etc.).

Figure 6A:
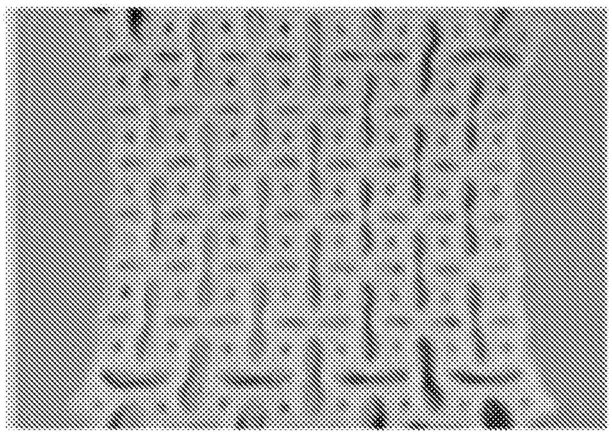
FIGS. 6A-B show an example of an auxetic structure in a fluid flow preventing condition and a flow enabling condition.
Figure 6B:
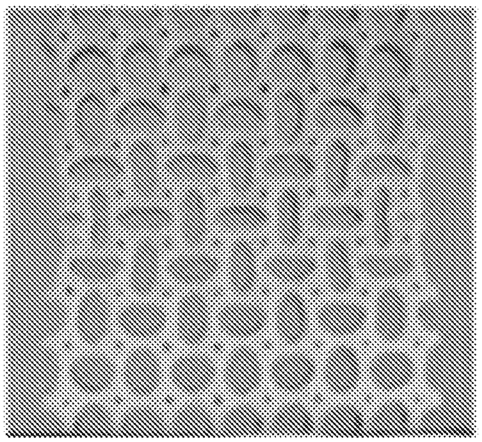

FIGS. 6A-B show an example of an auxetic structure in a fluid flow preventing condition and a flow enabling condition. The example auxetic structure shown in FIGS. 6A-B resembles a lattice arrangement, i.e., a space-filling unit, which may be placed within the nib or can even comprise the nib itself. In its passive state the free space within the auxetic structure is more or less zero, thus restricting the flow of a liquid, e.g., ink or pigment. When subjected to a temperature variation, the auxetic structure is activated, i.e., the multitude of spaces within the unit increase in size. This activation of the structure allows liquids to flow through. The size of the openings in the fluid flow preventing condition (FIG. 6A) are smaller compared to the size of the openings in the fluid flow enabling condition (FIG. 6B). The openings are generally in the nano or miro scale, e.g. 10 um to 200 um. Thus, a liquid such as an ink composition can be better transported through/across the auxetic structure in the fluid flow enabling condition. The switching of this material can be achieved by an electrical stimulus directly applied to the auxetic structure. The material may be a thermoactivated polymer, which is configured to be activated by a thermal stimulus. The material may be an electro activated material, which is configured to be activated by an electrical stimulus.

Switching of the auxetic structure may be achieved through a connection to an electrically powered system, e.g., to a battery. The electricity can be either converted to heat through a heating element that is in direct contact with the auxetic material and thus is configured to switch the material. In addition, or alternatively, the switching may be achieved by directly applying an electrical stimulus to the body of the material. The flow rate of the ink composition through/across the auxetic structure may correlate with the stimulus intensity (of electrical current/heat), which may be adjusted via a flow control system (mechanical or digital).

Figure 7:
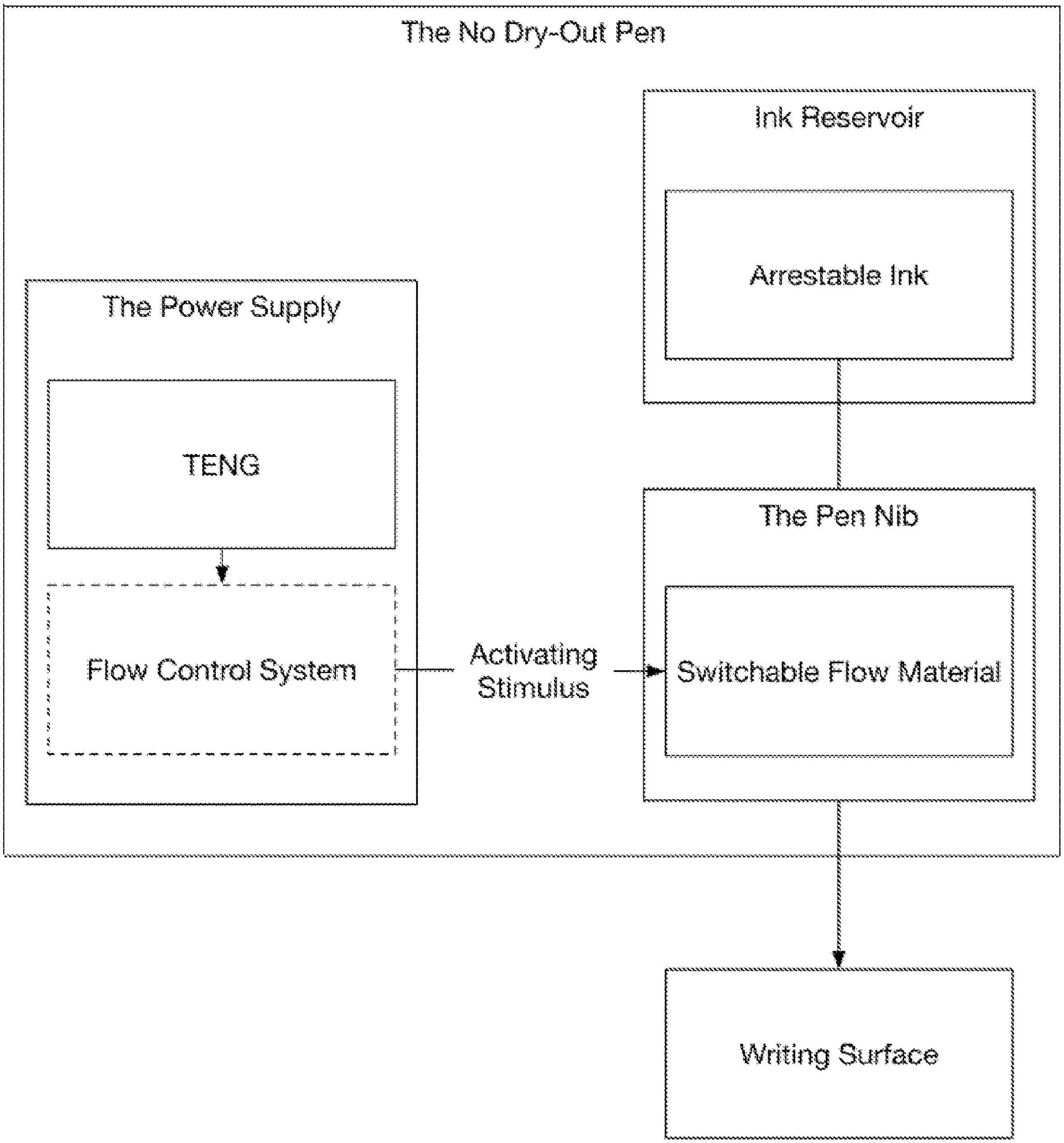
FIG. 7 shows a process flow diagram of an example writing instrument according to the present disclosure.

FIG. 7 shows a process flow diagram of an example writing instrument according to the present disclosure. The ink composition may be stored in the reservoir and be in fluid communication with the nib. In the example shown, a switchable flow material is comprised by the nib. The indicated position of the switchable flow material, however, is—as discussed—not intended to be limiting. The power source of the example of FIG. 7 comprises a friction-based generator in the form of a TENG module. The power source may alternatively or in addition comprise a battery. Optionally, the writing instrument comprises a flow control system with the above-described functionality. A stimulus may be transferred from the power source to the switchable flow material. The switchable flow material may be switched via the stimulus from one condition to the other. Shown in FIG. 7 is an activating stimulus, which may be used to switch the switchable flow material from the fluid flow preventing to the fluid flow enabling condition. It is to be understood that the reverse is also possible—as described above—the stimulus may switch the switchable flow material from a fluid flow enabling condition to a fluid flow preventing condition.

Figure 8:
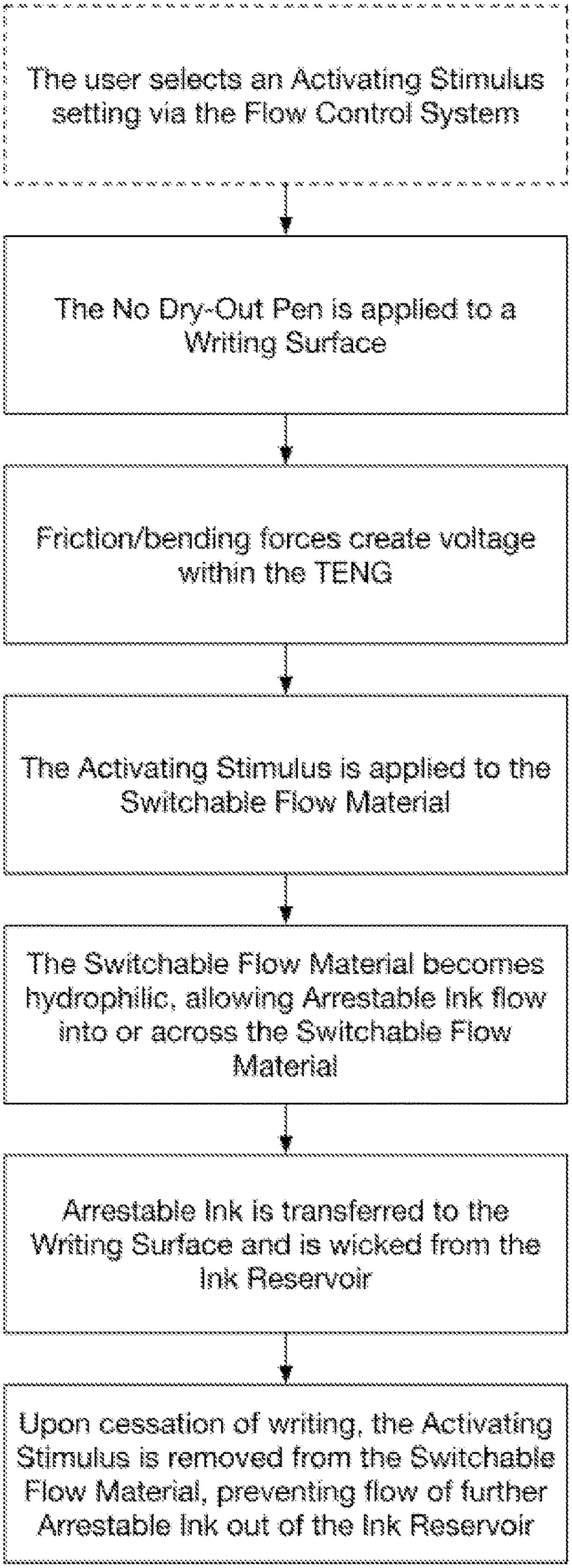
FIG. 8 shows a method of using a writing instrument according to the present disclosure.

FIG. 8 shows a method of using a writing instrument (10) according to the present disclosure. The indicated method steps may also be seen as instructions for using the writing instrument (10). The method comprises one or more of the following steps, in any order. Providing a writing instrument (10). Selecting a stimulus, which is configured to switch the switchable flow material (20) from a fluid flow preventing condition to a fluid flow enabling condition or vice versa. Selecting the stimulus may be performed via the flow control system. Selecting a stimulus may not be necessary in embodiments. Moving the nib (16) of the writing instrument (10) over a writing surface (100). Moving the nib (16) causes the nib (16) to flex and/or bend. In embodiments comprising a friction-based generator or a TENG module, the flexing/bending of the nib (16) generates energy. The energy is used for the stimulus for the switchable flow material (20), either directly, or indirectly, with a conversion of the energy, or with no conversion of the energy. An electrical energy may switch the switchable flow material from the fluid flow preventing condition to the fluid flow enabling condition. The stimulus switches the switchable flow material (20) from the fluid flow preventing condition to the fluid flow enabling condition. The writing instrument may comprise a stored electrical energy and the switching may be achieved through electronic sensing and/or manual user operation. The ink composition is transported to or towards the writing surface (100) if the switchable flow material (20) is in the fluid flow enabling condition. Once a user finished writing, the switchable flow material may become hydrophobic and the ink composition may retreat into the ink reservoir or may evaporate. The method may also comprise switching the switchable flow material in the switchable flow preventing condition, either by applying a stimulus or by removing a stimulus. The method may further comprise during or after use the step of cleaning the writing instrument, in particular the step of cleaning the switchable flow material. The cleaning step may be performed by a flow control system. The cleaning step may be performed by rinsing with a cleaning solution such as water.

In another aspect, the present disclosure provides a method of manufacturing a writing instrument comprising, in any order, the following steps. Obtaining one or more of the following components: a tubular body, a reservoir for an ink composition, a nib, and a switchable flow material. The switchable flow material is configured to switch between a fluid flow preventing condition and a fluid flow enabling condition by a stimulus (or vice versa). The method comprises the step of assembling the one or more components such that the switchable flow material is configured to control flow of the ink composition from the reservoir to a writing surface. The method further comprises (before, during or after assembly) filling the reservoir with the ink composition. The method may also comprise re-filling the reservoir with the ink composition after it is fully or partially emptied. Re-filling may be performed by the user or by the manufacturer or a third party. The method comprise applying a stimulus comprising electrical energy and/or thermal energy to a switchable flow material. The switchable flow material may comprise an electrowettable porous material, in particular a carbon nanotube porous or a carbon nanotube membrane. The method may further comprise assembling a power source, in particular a friction-based generator, in particular a triboelectric nanogenerator (TENG) to or into the writing pen. The method of manufacturing may comprise assembling additional steps in accordance with the above described embodiments, e.g. assembling a battery, conductive components, capacitive components, components of the flow control system or the like.

The above-described embodiments provide several advantages. In embodiments the availability of ink at the nib surface may be electrically controlled. The switchable flow material allows to control the flow of ink. Switching of the switchable flow material may be achieved directly (passively triggered control system) upon application of the pen to a writing surface by using a friction or pressure input to generate a voltage or current that alters the state of the switchable flow material. The switching may also be achieved through electronic sensing, or manual user operation, stored electrical energy and circuitry. The material may be embodied in a layer which is between the nib and the ink reservoir. This placement may have advantages, e.g., durability (as the switchable flow material may be subject to fewer mechanical forces), manufacturing cost advantages (a smaller flat section of switchable flow material may be required), the ink may not require the inclusion of electrolytes. Another advantage may be that the effective lifetime of the pen is increased without drying up or running out of ink. The pen may be capless, which is advantageous as it lowers stress for the user—caps cannot get misplaced. A capless pen is also advantageous as it lowers barriers to start writing—the cap does not need to be removed.

In the following, the present disclosure will be further elaborated by way of examples.

Example 1

Figure 9:
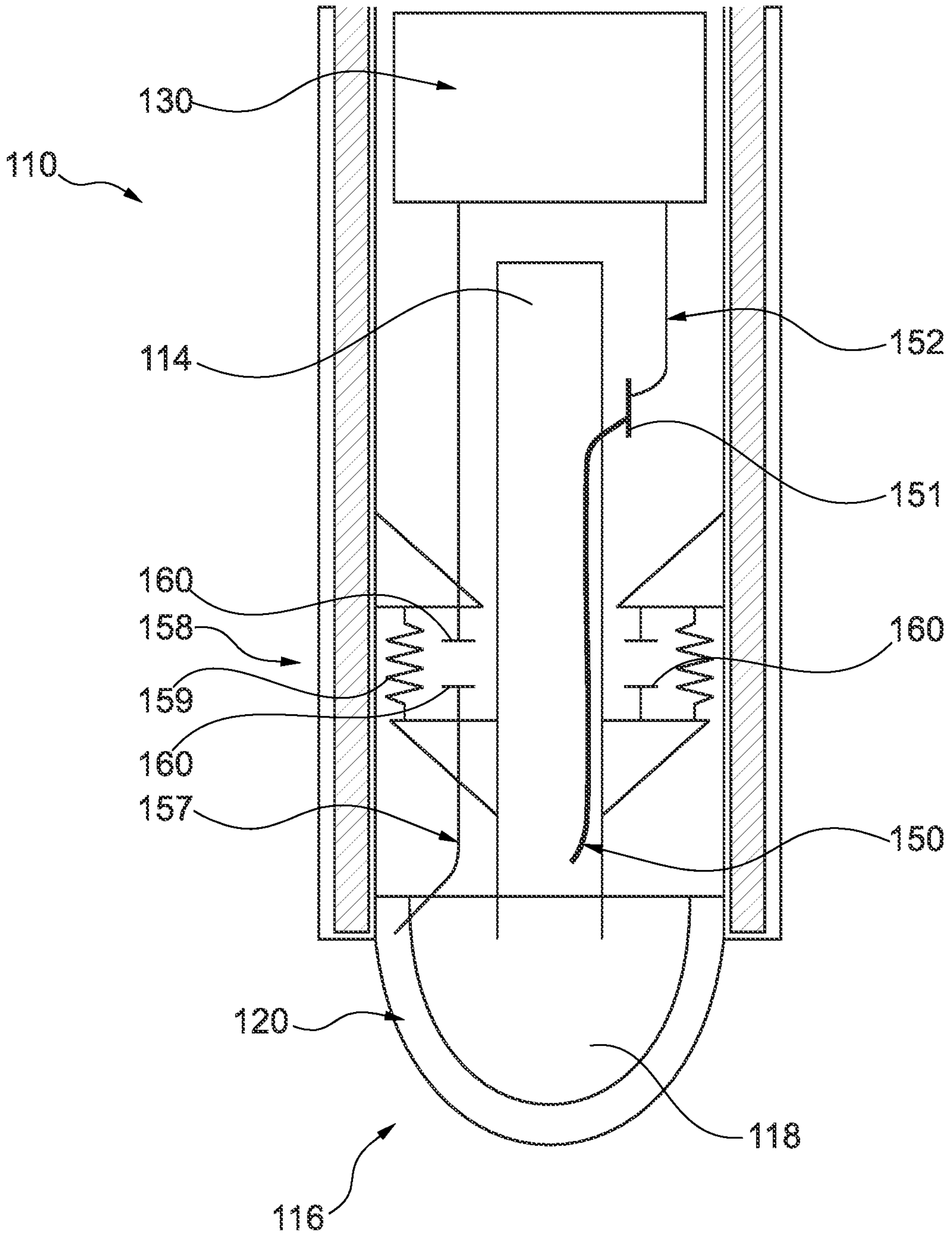
FIG. 9 shows an example circuitry of a writing instrument.

Example 1 will be described in context with FIG. 9 in more detail. The writing instrument (110) is equipped with:

1. A fluid ink which is held within a reservoir (114) with an electrolyte in solution such as 1M KOH. The ink contains pigments and other components to make it suitable for visibly marking surfaces such as paper.
   a. The ink in this example is held in a permanent, non-removable chamber which is enclosed within the pen body. The ink could also be held in a removable chamber. The chamber in this example is formed from PET, but it could also be formed from PTFE or other polymer.
   b. The chamber in this example includes an electrode (150) (in this example copper, but it could also be another metal) which is in contact with the ink at the distal end of the chamber (near the nib 116), with a corresponding contact point (151) on the outside of the chamber. In this example this is a conductive copper plate which is continuous with the copper electrode and which in this example is connected via a solder joint.
2. In this example, the electrically controlled switchable flow material (120) is in the form of a carbon nanotube (CNT) sponge or porous material which is naturally slightly hydrophobic and can be switched to hydrophilic at an applied voltage of −0.52V applied between the ink and the sponge. The sponge material (120) covers the entire outer surface of the nib (116) of the writing instrument (110) which contacts the writing surface (similar as shown in FIG. 1). The sponge material in this example is about 1 mm in thickness but it could also deviate from this thickness.
   a. The CNT sponge material of this example is grown on a copper layer (initially forming the outer surface of the nib) which is subsequently etched away by chemical means in the central area which will be used for ink flow. The MWCNTs that are formed have in this example an average thickness of 50 nm and a length of 50 nm but other dimensions are also possible. The grown sponge material in this example has an effective pore radius of 80*nm* but other dimensions are also possible. An outer section in this example is protected by an applied mask during the etching process, leaving a copper ring around the outer ring edge of the shape which is not in contact with the writing surface. This copper surface is electrically contacted by conventional solder bonding.

i. Optionally, thin elements of the copper layer may also be masked across the nib surface to form a grid of copper tracks for more even distribution of electrical potential through the CNT sponge.

b. Without application of an electrical stimulus, the ink does not flow into the CNT sponge layer, and diffusion of vapor across the CNT sponge layer is limited by the hydrophobicity and layer thickness.

i. Note: Much lower evaporation is observed from carbon-based sponge materials such as CNT sponges when the material is in a hydrophobic state. Similar effects can be observed with aligned CNT membranes and graphene oxide membranes, which have the advantage of being able to arrest flow when saturated with water.

c. Altering the charge state of the CNT sponge to hydrophilic enables ink to flow into the layer such that the ink is available on the nib surface and drawn through the layer by application of ink to the writing surface pulling further ink from the reservoir via capillary forces.

i. Gravity and positive pressure may also cause the flow of ink into the layer upon state switching but any positive pressure must be tuned such that it does not overcome the hydrophobic force during the hydrophobic state.

d. The hydrophilic state is removed at the cessation of writing whereupon any ink on the surface or held within the CNT sponge layer may evaporate over time or be drawn back into the reservoir.

e. The ink in the reservoir is again prevented from significant drying by the hydrophobic CNT sponge layer.

3. A power source (130) and circuitry such as a battery unit which is connected to the fluid reservoir (114) via a permanent wire (152) adjoined to the copper electrode (150) in the ink reservoir (114), and connected to the switchable flow material (120) via an intermittent path (157), where the connection may be made or broken by a pressure switch (158).

a. The pressure switch (158) is mechanically connected to the pen nib (116) such that when pressure is applied to the pen nib (116) for the initiation of writing, the switch (158) is activated and completes the electrical connection between the power source (130) and CNT sponge (120).

b. The pressure switch (158) in this example consists of multiple electrically conducting pads (160) on the facing surfaces of two rings around the ink reservoir (114) which are separated by a space with a spring element (159) in the space between the conducting pads (160) such that when the user presses the nib (116) downwards axially along the pen body, the conducting pads (160) reversibly come into contact irrespective of the orientation of pen holding. Other switches are of course also possible.

c. The power source (130) and circuitry in this example are configured to apply a constant 0.52V potential difference. Other voltages are also possible.

d. A mechanism and circuitry to recharge the power source such as using a standard USB-C port is used in this example but not necessary.

Example 2

Figure 10:
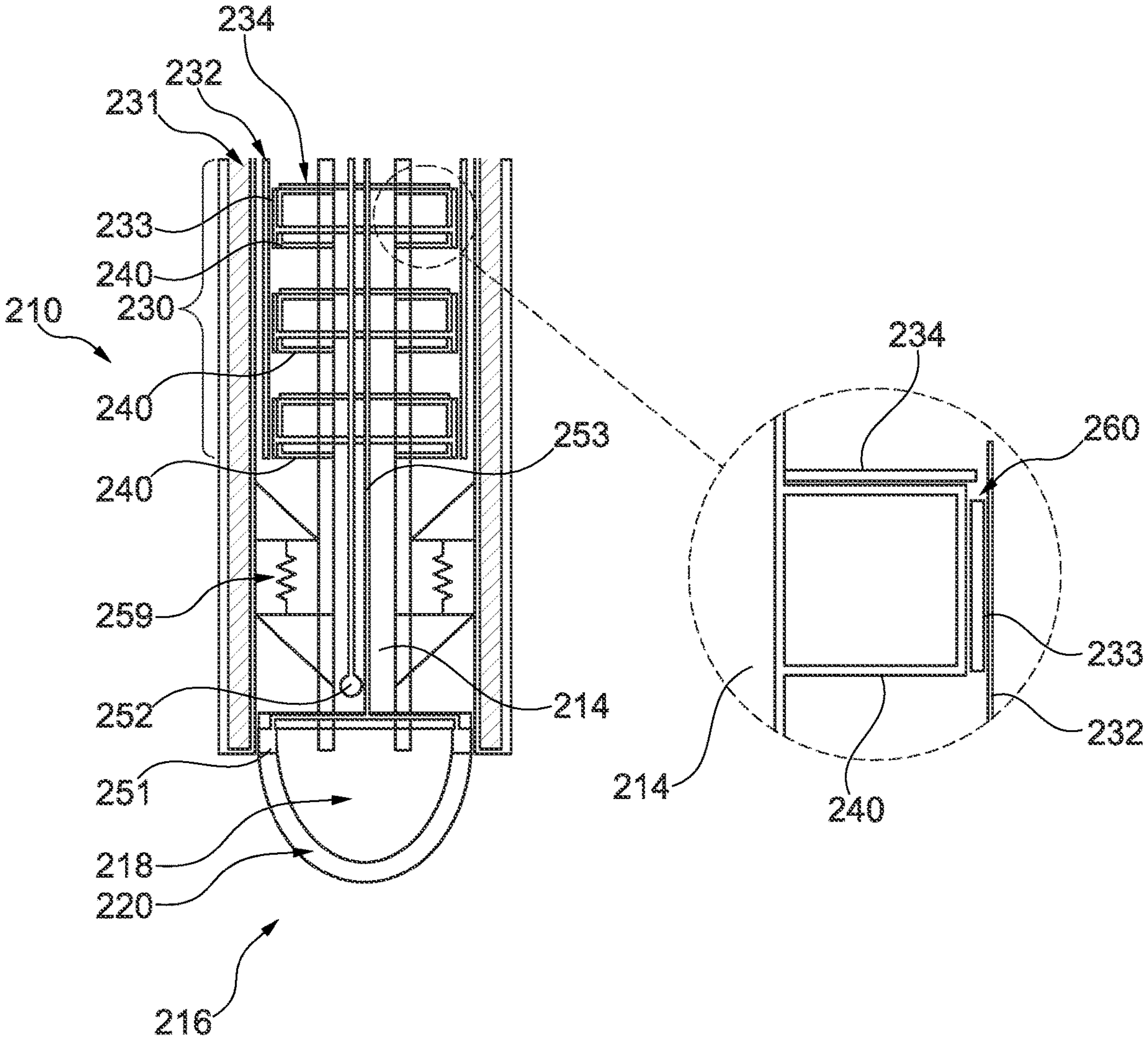
FIG. 10 shows an example of a writing instrument with a TENG system.

Example 2 will be described in context with FIG. 10 in more detail. The writing instrument (210) is prevented from drying out by using an electrocapillary sponge layer (220) or electrowettable porous layer (220) on the outside of the nib (216), where voltage is automatically applied to the sponge or porous layer at the temporal point at which the pen contacts the writing surface to enable ink flow. This voltage may be passively applied in a system with a TENG (230) which generates power to actuate the sponge at the point that the nib flexes, indicating the pen is pressed to a surface.

The TENG (230) in this example is embodied as a direct DC power source to the electrowettable porous layer (220) where electrode (252) of the TENG (230) is connected directly to the ink reservoir (214) and where electrode (253) is directly connected to the electrowettable layer (220), e.g. via a metal ring (251) such as a copper ring. The TENG (230) in this example is be embodied within the pen barrel as a series of 3 mm thick, 3 mm wide acrylic rings (240) with 3 mm gaps between each ring (240), where the inner surface of the ring (240) is bonded to the outer surface of the ink reservoir (214) which occupies the central axis of the pen barrel (note that the dimensions of the rings are not intended to be limiting). The outer pen housing of the barrel in this example has a continuous acrylic layer (231) which is bonded to a 50 μm thick triboelectric layer (232) such as PTFE on the inner surface. The PTFE layer (232) in this example has a microstructure or nanostructure surface patterning for increased roughness and triboelectric effect. The acrylic rings (240) in this example are backed by a copper foil layer (233) on the outer surface of the ring (50 μm thick), covering the whole surface apart from 0.1 mm depth from the distal edge of the ring. This copper layer (233) is in contact with the PTFE layer (232) but not bonded by any means such that the two layers can slide against one another but are held in contact by the structure of the outer casing and the inner ink reservoir (214). The acrylic rings (240) are also bonded to a second, separate copper foil layer (234) which is adhered to the distal side of the acrylic ring (240) with a 0.1 mm gap (260) between the inner edge of the copper and the triboelectric PTFE layer (232) (a $3^{rd}$ copper layer may be added to the proximal side which is identical to the $2^{nd}$ to double the current output). The first copper layer (234) of each ring structure (240) is connected via electrodes (253) to the porous electrowettable layer (220) in the pen nib (216), and the second copper layer (233) of each ring (240) is connected to the electrode (252) which contacts the ink in the ink reservoir (214). The TENG described in this example is similar to the TENG described by Liu et al in Science Advances 5 Apr. 2019: Vol. 5, no. 4, eaav6437, which is incorporated hereby in its entirety. The ink reservoir (214) in this example is mechanically connected to the pen nib (216) via an inflexible mechanism (direct bonding of the nib material and electrowettable layer) and connected to the pen barrel casing via a flexible connection such as a spring mechanism (259). The spring mechanism (259) in this example is a metallic spring which is coiled around the distal end of the ink reservoir (214), ending on a physical stopper that is joined to the ink reservoir on the proximal side, and a physical stopper that is joined to the pen casing on the distil side. Such a spring mechanism (259) enables the ring structures to slide up and down against the PTFE layer as the downward pressure forces vary during writing. Other spring mechanisms are of course also possible.

During writing, natural movements of the writing instrument (210) therefore keep the sponge in the hydrophilic state. The main steps are as follows:

1. Application of a voltage to structures in the pen nib (216) triggers the flow behavior of a switchable flow material (220) to change, allowing ink to pass through from the ink reservoir (214).
2. Ink becomes available on the surface of the nib (216), allowing the writing instrument (210) to be used for writing.
3. Removal of the voltage when the user stops writing reverses the state of the switchable flow material (220), preventing further ink from being transported to the pen nib (216).
4. As a result, evaporation of the ink within the nib (216) is prevented or greatly reduced.

Example 3

Figure 11:
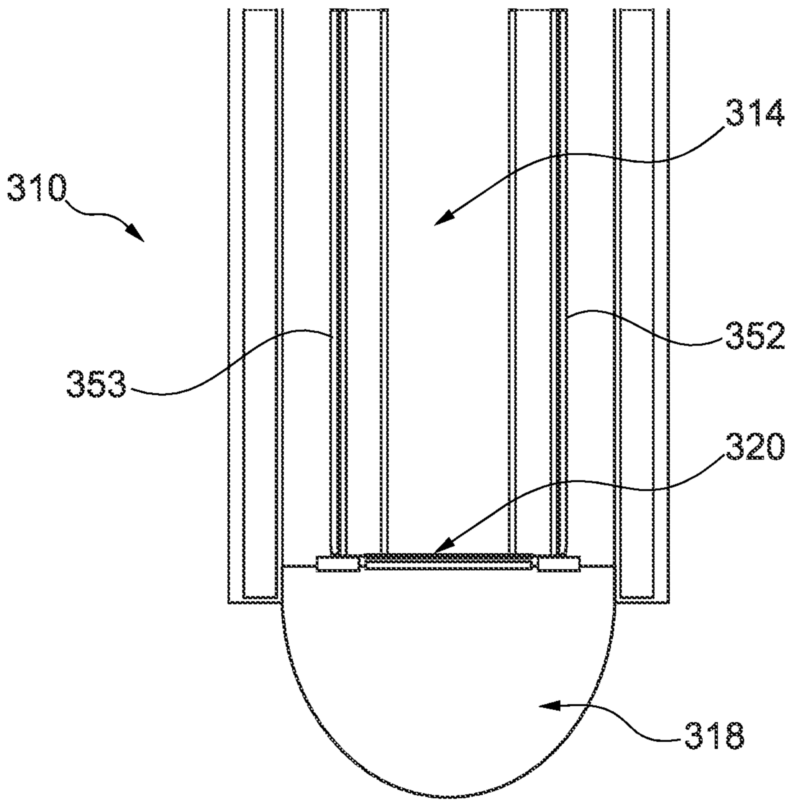
FIG. 11 shows an example a writing instrument with a membrane structure.
Figure 12:
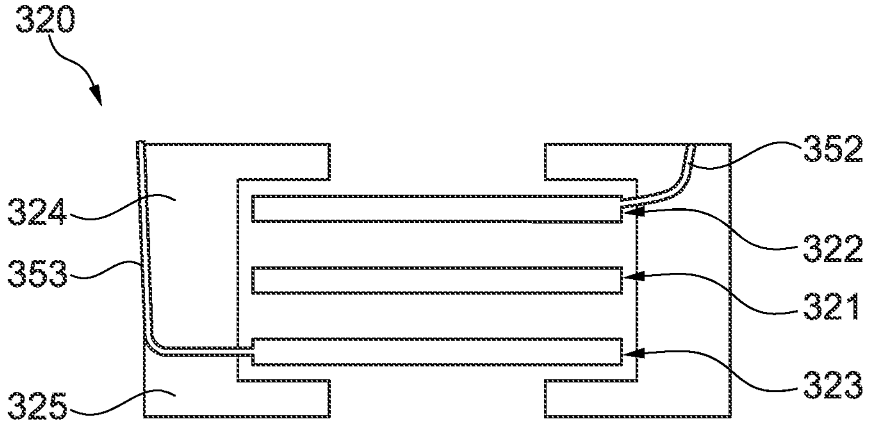
FIG. 12 shows a detail of the writing instrument of FIG. 11.

Example 3 will be described in more detail in context with FIG. 11 and FIG. 12, which shows a detail of FIG. 11. Writing instrument (310) comprises a graphene smart membrane (320), which is used to control ink flow and which is shown in more detail in FIG. 12. Conductive filaments (352, 353) are arranged within the electrically insulating graphene oxide membrane consisting of multiple layers of graphene or graphene oxide (flakes) (321) with a total thickness of 1 μm, where the conductive filaments (352, 353) extend between the layers of graphene (321), enabling cross-plane conductivity. The graphene layers (321) are adjoined by a porous silver electrode (322) (wherein the porous silver electrode can have a 0.2 μm pore diameter and a 10 μm thickness) attached to the top surface, and a porous gold electrode (323) (wherein the porous gold electrode can have a 0.2 μm pore diameter and a 10 nm thickness) attached to the bottom surface. The entire membrane may be 4 mm in diameter and attached to a PET or PTFE ring (324) which has a 0.5 mm thickness, 10 mm outer diameter and 2 mm inner diameter (glued by epoxy resin). A second PET or PTFE ring (325) may be attached to the first ring (324) from the other side of the membrane, sandwiching the outer ring of the membrane between the PET structures. The ring structures (324, 325) in this example are stiff such that the sandwiched membrane is protected from bending. The first PET or PTFE ring (324) in this example is sealed to the ink reservoir (314) such that any ink leaving the reservoir must pass through the membrane (320). The second PET or PTFE ring in this example is bonded to a porous nib structure (318) measuring for example 2 mm in diameter and 1 mm thickness.

The top and bottom electrodes are connected to a power source such as a lithium-ion battery and control circuitry. Specifically, a variable resistor in this example is controlled by a UI feature on the side of the writing device, where the user in this example selects resistance levels that correspond to changing voltage and current that is applied between the electrodes across the graphene membrane (320). One setting in this example increases the resistance to infinite corresponding to an ‘off’ setting.

During writing in the off setting, ink flows normally from the ink reservoir (314) onto the writing surface by flowing through the membrane (320) and nib (318). As lower resistance settings are selected, an electric current is passed through these nano-filaments in the graphene membrane (320) which creates a large electric field which ionizes the water molecules and thus controls the water transport through the graphene capillaries in the membrane (320). With that flow of ink is electrically controlled, enabling the user to select the ‘heaviness’ or thickness properties of the line which is being drawn.

In the drawings, the reference numbers are used as follows:

10, 110, 210, 310 Writing instrument
12 Tubular body
14, 114, 214, 314 Reservoir for an ink composition
16, 116, 216, 316 Nib
18, 118, 218, 318 Bulk material of nib
20, 120, 220, 320 Switchable flow material
30, 130 Power source
31 First layer of friction based generator
32 Second layer of friction based generator
40 Heating element
100 Writing surface
150 Electrode
151 Contact point
152 Permanent wire
157 Electrode with intermittent path
158 Pressure switch
159 Spring element
160 Conducting pads
230 TENG system
231 Acrylic layer
232 triboelectric layer
233 metal layer
234 metal layer
240 acrylic ring
252 electrode
253 electrode
259 spring mechanism
260 gap
321 graphene oxide layer
322 silver electrode
323 gold electrode
324 PET or PTFE ring
325 PET or PTFE ring
352 electrode
353 electrode Although the present invention has been described above and is defined in the attached claims that follow this section, it should be understood that the concepts of the present disclosure may alternatively be defined in accordance with the following non-limiting and exemplary embodiments:

1. A writing instrument comprising:
   a tubular body (12);
   a reservoir (14) for an ink composition; and
   a nib (16) comprising a switchable flow material (20), wherein the switchable flow material (20) is configured to switch between a fluid flow preventing condition and a fluid flow enabling condition by a stimulus, wherein the switchable flow material (20) is configured to control flow of the ink composition from the reservoir (14) to or towards a writing surface (100).

2 The writing instrument of embodiments 1, wherein the switchable flow material (20) is hydrophobic in the fluid flow preventing condition.

3. The writing instrument of embodiment 1 or 2, wherein the switchable flow material (20) is hydrophilic in the fluid flow enabling condition.

4. The writing instrument of any of embodiments 1 to 3, wherein the stimulus comprises electrical energy and/or thermal energy.
5. The writing instrument of any of embodiments 1 to 4, wherein the switchable flow material (20) comprises a porous material, in particular an electrowettable porous material.
6. The writing instrument of embodiment 5, wherein the porous material is arranged in the form of a layer or a membrane.
7. The writing instrument of any of embodiments 5 or 6, wherein the porous material comprises pores with a controllable pore size.
8. The writing instrument of any of embodiments 1 to 7, wherein the switchable flow material (20) comprises carbon nanotubes (CNT), in particular a carbon nanotube porous material or a carbon nanotube membrane.
9. The writing instrument of any of embodiments 1 to 8, wherein the switchable flow material (20) comprises graphene, in particular a graphene oxide membrane.
10. The writing instrument of any of embodiments 1 to 9, wherein the switchable flow material (20) comprises an auxetic structure.
11. The writing instrument of any of embodiments 1 to 10, wherein the switchable flow material (20) comprises a thermoactivated polymer and/or a shape-memory material.
12. The writing instrument of any of embodiments 1 to 11, wherein the nib (16) comprises a bulk material (18) and the switchable flow material (20) at least partially covers the bulk material (18), in particular wherein the switchable flow material (20) substantially covers all surfaces of the nib (16), which face towards the exterior.
13. The writing instrument of embodiment 12, wherein the bulk material (18) of the nib (16) is configured to transfer the ink composition from the reservoir (14) towards a writing surface (100), in particular wherein the bulk material (18) of the nib (16) comprises fibers, a porous composite, a foam, a polyurethane foam, a cellulose material, a mineral material, a plastic material, an elastomer material, an hyperelastomer material, an elastomer bead material, a bead material, a natural material such as a cork or bast, in particular wherein the material of the nib (16) has a diameter of at least 0.3 mm.
14. The writing instrument of any of embodiments 1 to 13, further comprising a protective material, which at least partially covers the switchable flow material (20), in particular wherein the protective material is the same material as the material of the nib (16) or a modified form of the material of the nib (16), in particular, wherein the protective material forms a layer of about 0.3 mm to about 15 mm.
15. The writing instrument of any of embodiments 1 to 14, wherein the switchable flow material (20) is arranged in two or more layers, in particular wherein the layers are separated by an electrically insulating layer.
16. The writing instrument of any of embodiments 1 to 15, wherein the writing instrument comprises a power source (30).
17. The writing instrument of embodiment 16, wherein the power source (30) comprises a friction-based generator, in particular a triboelectric nanogenerator (TENG).
18. The writing instrument of embodiment 17, wherein the friction-based generator comprises layers of different materials arranged face to face, in particular wherein the layers are slidable relative to one another.
19. The writing instrument of embodiment 18, wherein the friction-based generator is arranged in the distal portion of the tubular body (12) and wherein a portion of the nib (16) is connected to at least an inner layer of the friction-based generator.
20. The writing instrument of embodiment 19, wherein the switchable flow material (20) of the nib (16) is connected to a layer of the friction-based generator.
21. The writing instrument of any of embodiments 19 or 20, wherein the writing instrument is configured such that bending forces of the nib (16) and/or movements of the nib (16) relative to the tubular body (12) are transferred to an inner layer of the friction-based generator, thereby generating electrical energy for switching the switchable flow material (20).
22. The writing instrument of embodiment 16, wherein the power source (30) comprises a battery.
23. The writing instrument of any of embodiments 16 to 22, further comprising conductive components to transfer electrical energy from the power source (30) to the switchable flow material (20).
24. The writing instrument of any of embodiments 16 to 23, further comprising capacitive components to process the output from the power source (30).
25. The writing instrument of any of embodiments 16 to 24, wherein the power source (30) is configured to deliver a low voltage to the switchable flow material (20), in particular a voltage between −2 V to +2 V, in particular a voltage between −0.52 V to 1 V.
26. The writing instrument of any of embodiments 4 to 25, further comprising a heating element (40) configured to convert electrical energy to thermal energy.
27. The writing instrument of any of embodiments 1 to 26, further comprising a flow control system.
28. The writing instrument of embodiment 27, wherein the flow control system is configured to modify, change, and/or select the stimulus.
29. The writing instrument of embodiment 28, wherein the flow control system is configured to control a voltage, which is applied to the switchable flow material (20).
30. The writing instrument of any of embodiments 27 to 29, wherein the flow control system is configured to perform a cleaning protocol.
31. The writing instrument of any of embodiments 1 to 28, wherein the ink composition comprises one or more of water, alcohol, and ester-based solvents.
32. The writing instrument of embodiment 31, wherein the ink composition comprises a water solution with 1M KOH.
33. The writing instrument of any of embodiments 1 to 32, wherein the switchable flow material (20) is hydrophobic and can be switched to hydrophilic at an applied voltage of −0.52 V and the ink composition comprises a water solution with 1 M KOH.
34. The writing instrument of any of embodiments 1 to 33, wherein the stimulus is configured to switch the switchable flow material (20) from the fluid flow preventing condition to the fluid flow enabling condition.
35. The writing instrument of any of embodiments 1 to 33, wherein the stimulus is configured to switch the switchable flow material (20) from the fluid flow enabling condition to the fluid flow preventing condition.

36. The writing instrument of any of the preceding embodiments, wherein the writing instrument is a felt pen, a highlighter, or a permanent or non-permanent marker.
37. A method of manufacturing a writing instrument comprising the following steps:
    obtaining the following components: a tubular body (12), a reservoir (14) for an ink composition, a nib (16), and a switchable flow material (20), which is configured to switch between a fluid flow preventing condition and a fluid flow enabling condition by a stimulus;
    assembling the components such that the switchable flow material (20) is configured to control flow of the ink composition from the reservoir (14) to or towards a writing surface (100); and
    filling the reservoir (14) with the ink composition.
38. The method of embodiment 37, wherein the stimulus comprises electrical energy and/or thermal energy.
39. The method of any of embodiment 37 or 38, wherein the switchable flow material (20) comprises an electrowettable porous material, in particular a carbon nanotube porous or a carbon nanotube membrane.
40. The method of any of embodiment 37 to 39, wherein the writing instrument further comprises a power source (30), in particular a friction-based generator, in particular a triboelectric nanogenerator (TENG).
41. A method of using a writing instrument comprising:
    providing a writing instrument according to any of embodiments 1 to 36;
    switching the switchable flow material (20) to the fluid flow enabling condition;
    applying the ink composition to a writing surface (100).
42. The method of embodiment 41, wherein the switching is achieved by moving the nib (16) over a writing surface (100).
43. The method of embodiment 42, wherein the writing instrument comprises a friction-based generator, in particular a triboelectric nanogenerator (TENG), which generates electrical energy in response to moving the nib (16) over the writing surface (100).
44. The method of embodiment 43, wherein the electrical energy switches the switchable flow material (20) from the fluid flow preventing condition to the fluid flow enabling condition.
45. The method of embodiment 41 to 44, wherein the writing instrument comprises a stored electrical energy and the switching is achieved through electronic sensing and/or manual user operation.
46. The method of any of embodiments 41 to 45, further comprising the step of cleaning the writing instrument, in particular the step of cleaning the switchable flow material (20).
47. The method of embodiment 46, wherein the cleaning step is performed by a flow control system.
48. The method of any of embodiments 46 or 47, wherein the cleaning step is performed by rinsing with a cleaning solution such as water.

What is claimed:

1. A writing instrument comprising:
a tubular body;
a reservoir for an ink composition; and
a nib comprising a switchable flow material, wherein the switchable flow material is configured to switch between a fluid flow preventing condition and a fluid flow enabling condition by a stimulus, wherein the switchable flow material is configured to control flow of the ink composition from the reservoir to or towards a writing surface and the stimulus comprises at least one of electrical energy or thermal energy.

2. The writing instrument of claim 1, wherein the switchable flow material comprises a porous material.

3. The writing instrument of claim 2, wherein the switchable flow material comprises an electrowettable porous material.

4. The writing instrument of claim 1, wherein the switchable flow material comprises carbon nanotubes (CNT).

5. The writing instrument of claim 4, wherein the switchable flow material comprises a carbon nanotube porous material or a carbon nanotube membrane.

6. The writing instrument of claim 1, wherein the switchable flow material comprises a thermoactivated polymer.

7. The writing instrument of claim 1, wherein the switchable flow material comprises a shape-memory material.

8. The writing instrument of claim 1, wherein the switchable flow material comprises an auxetic structure.

9. The writing instrument of claim 1, wherein the nib comprises a bulk material and the switchable flow material at least partially covers the bulk material, or, wherein the switchable flow material is arranged within or proximal to the nib.

10. The writing instrument of claim 1, wherein the switchable flow material is arranged in two or more layers.

11. The writing instrument of claim 10, wherein the layers are separated by an electrically insulating layer or by bulk material.

12. The writing instrument of claim 1, further comprising a flow control system configured to modify, change, and/or select the stimulus.

13. The writing instrument of claim 1, wherein the stimulus is configured to switch the switchable flow material from the fluid flow preventing condition to the fluid flow enabling condition, or, wherein the stimulus is configured to switch the switchable flow material from the fluid flow enabling condition to the fluid flow preventing condition.

14. A writing instrument comprising:
a tubular body;
a reservoir for an ink composition; and
a nib comprising a switchable flow material, wherein the switchable flow material is configured to switch between a fluid flow preventing condition and a fluid flow enabling condition by a stimulus, wherein the switchable flow material is configured to control flow of the ink composition from the reservoir to or towards a writing surface and wherein the writing instrument comprises a power source in a form of at least one of a generator or a battery
wherein the power source comprises a friction-based generator.

15. The writing instrument of claim 14, wherein the writing instrument is configured such that at least one of bending forces of the nib or movements of the nib are transferred to a layer of the friction-based generator, thereby generating electrical energy for switching the switchable flow material.

16. The writing instrument of claim 14, further comprising a heating element configured to convert electrical energy to thermal energy.

17. A writing instrument comprising:
a tubular body;
a reservoir for an ink composition; and
a nib comprising a switchable flow material, wherein the switchable flow material is configured to switch between a fluid flow preventing condition and a fluid flow enabling condition by a stimulus, wherein the switchable flow material is configured to control flow of the ink composition from the reservoir to or towards a writing surface, wherein the switchable flow material is hydrophobic in the fluid flow preventing condition and hydrophilic in the fluid flow enabling condition.

18. The writing instrument of claim 17, wherein the switchable flow material comprises a porous material.

19. The writing instrument of claim 18, wherein the switchable flow material comprises an electrowettable porous material.

* * * * *